United States Patent
Che et al.

(10) Patent No.: US 11,824,604 B2
(45) Date of Patent: Nov. 21, 2023

(54) MASSIVE MIMO WIRELESS ENERGY TRANSMISSION METHOD BASED ON DYNAMIC FRAME TRANSMISSION

(71) Applicant: Shenzhen University, Shenzhen (CN)

(72) Inventors: Yueling Che, Shenzhen (CN); Yishen Li, Shenzhen (CN); Liangzhu Li, Shenzhen (CN); Sheng Luo, Shenzhen (CN); Kaishun Wu, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 17/955,325

(22) Filed: Sep. 28, 2022

(65) Prior Publication Data

US 2023/0119957 A1    Apr. 20, 2023

Related U.S. Application Data

(63) Continuation of application No. PCT/CN2021/123801, filed on Oct. 14, 2021.

(51) Int. Cl.
*H04B 7/0456* (2017.01)
*H04L 27/26* (2006.01)

(52) U.S. Cl.
CPC ....... *H04B 7/0456* (2013.01); *H04L 27/2602* (2013.01)

(58) Field of Classification Search
CPC .. H04B 7/0456; H04B 7/0413; H04B 7/0452; H04B 7/0617; H04B 7/0626; H04L 27/2602; H04L 27/2613; H04L 5/0048
See application file for complete search history.

(56) References Cited

U.S. PATENT DOCUMENTS

| | | | |
|---|---|---|---|
| 2012/0120907 A1* | 5/2012 | Kishigami | H04L 5/0051 370/329 |
| 2015/0229133 A1 | 8/2015 | Reynolds et al. | |
| 2016/0294461 A1* | 10/2016 | Bengtsson | H04B 7/0684 |
| 2017/0104561 A1* | 4/2017 | Agardh | H04L 5/0023 |
| 2019/0074876 A1* | 3/2019 | Kakishima | H04L 5/005 |
| 2020/0014433 A1* | 1/2020 | Bengtsson | H04W 72/0453 |

FOREIGN PATENT DOCUMENTS

| | | |
|---|---|---|
| CN | 104600873 A | 5/2015 |
| CN | 104601297 A | 5/2015 |
| CN | 110414289 A | 11/2019 |

\* cited by examiner

*Primary Examiner* — Khanh C Tran
(74) *Attorney, Agent, or Firm* — Nitin Kaushik

(57) ABSTRACT

The present application discloses a massive MIMO wireless energy transmission method based on dynamic frame transmission. The method comprises the following steps: controlling, by a base station, each antenna to transmit a pilot signal to a user end in a time-sharing mode by using set time-sharing pilot frames; acquiring, by the user end, downlink channel state information from the antennae of the base station to the user end and feeding the downlink channel state information back to the base station; and calculating, by the base station, a precoding matrix based on the downlink channel state information, mapping data from a user layer to an antenna port by using the newly calculated precoding matrix, and performing beam forming calculation with maximization of an energy signal of the user end as a goal.

10 Claims, 23 Drawing Sheets

| Frame number | 1 | 2 | 3 | ... | $N_{bs}+1$ | $N_{bs}+1$ | $N_{bs}+2$ | ... | $N_{bs}+N_{f1}+1$ |
|---|---|---|---|---|---|---|---|---|---|
| Frame sequence | Synchronous symbol | Pilot 1 | Pilot 2 | ... | Pilot $N_{bs}$ | Blank | Energy symbol 1 | ... | Energy symbol $N_{f1}$ |

FIG. 9

| Frame number | 1 | 2 | 3 | | $N_{f2}+1$ |
|---|---|---|---|---|---|
| Frame sequence | Synchronous symbol | Energy symbol 1 | Energy symbol 2 | ... | Energy symbol $N_{f2}$ |

FIG. 10

MASSIVE MIMO WIRELESS ENERGY TRANSMISSION METHOD BASED ON DYNAMIC FRAME TRANSMISSION

TECHNICAL FIELD

The present application relates to the technical field of communications, and in particular to a massive MIMO wireless energy transmission method based on dynamic frame transmission.

BACKGROUND

At present, the development of the era of the internet of things has been accelerated along with the massive deployment of 5G base stations, and the energy sustainability of the sensor nodes of the internet of things is challenged. However, most wireless devices have battery functions and cannot meet the sustainability requirements. Wireless energy transmission (WET) technology facilitates battery charging to extend the lifetime of wireless networks, such as sensor networks. The basic principle of wireless energy transmission technology is that a transmitting end device performs wireless transmission of energy through radio waves (electromagnetic fields or electromagnetic waves), and a receiving end device converts the energy of the radio waves into electric energy through energy collection technology for storage and utilization. Wireless energy transmission also suffers from propagation losses including path loss, shadowing, fast fading and the like. Thus, transmission efficiency is a key and challenging issue for wireless energy transmission.

The massive antenna technology is a main technical means for improving the frequency spectrum utilization rate and the system capacity in the fifth generation mobile communication. Conventional MIMO is basically less than 8 antennae, and massive MIMO is most particularly characterized by a multiple of the number of antennae, which is at least 32. Massive MIMO uses a vertical dimension space domain with reference to a component in a vertical direction on the basis of a horizontal dimension space, and the shape of outward radiation of a signal is an electromagnetic wave, so that 3D-MIMO is another name of massive MIMO.

Beamforming, also known as spatial filtering, is a signal processing technology used in massive antenna arrays to transmit or receive signals in a particular direction. The principle is that by continuously adjusting the amplitude and phase of each antenna in the antenna array, or by adjusting IQ (In-phase, Quadrature) signals through a digital precoding technology, signals at specific angles are subjected to constructive interference while signals at other angles are subjected to destructive interference, and transmitted signals of a plurality of antennae form a beam main lobe to point to a target UE (user equipment) end, so that the energy received by the UE end is increased; and because the signal transmission has directivity, the energy of the signal received by a non-target UE end is relatively small, thereby effectively inhibiting the co-channel interference and reducing unnecessary energy consumption.

At present, researchers have proposed various time allocation solutions and channel feedback solutions for wireless portable communication networks, but these solutions are basically based on theoretical considerations, and there are many problems in practical communication systems when the solutions are applied. For example, how to improve the signal-to-interference-plus-noise ratio (SINR) of the receiving end to improve the signal quality, how to increase the channel capacity to improve the data transmission rate, and the like, and problems related to the energy supply source of the receiving end are not taken into consideration. In addition, the wireless energy transmission technology based on massive MIMO is still in the initial stage of research, and there are many problems in theory and practical application, such as the problems of accuracy and instantaneity in channel estimation, the problem of beam design in a multi-antenna system, and the problem of precoding algorithm in different user scenarios.

For example, in a mobile communication system, the accuracy of the channel state information greatly affects the effectiveness of signal transmission, and the process of acquiring the channel state information is called channel estimation. Channel estimation can usually be calculated using training sequences or transmitted pilots, but in massive MIMO systems, the large number of antennae result in a proliferation in the amount of channel estimation calculations. In order to avoid massive feedback of channel state information by massive MIMO, a channel matrix can be estimated by directly utilizing uplink pilots on the basis of channel reciprocity through time division multiplexing communication. Firstly, a user transmits a pilot signal, a base station acquires all user channel state information of a system, and then the base station detects uplink data by using the estimated channel state information while transmitting a downlink data signal and generates a downlink precoding equalization matrix. However, this method may cause pilot pollution, and for a multi-user massive MIMO system, pilot sequences between different users are different between different base stations, so that pilots between them are not completely orthogonal, which may cause interference between users, thereby reducing transmission performance.

Through analysis of the prior art, the wireless energy-carrying communication technology is suitable for short-distance wireless communication networks which are small in network coverage, large in number of network nodes and intelligent in application, such as devices which are low in power consumption and low in data transmission, such as a wireless sensor network and an intelligent home network. For example, in a basic wireless energy-carrying communication system, a base station acquires energy from natural environments such as wind energy and solar energy and stores the energy, and then transmits the energy and information to each mobile device in a wireless signal manner; the mobile device receives electromagnetic waves to acquire energy, and transmits the information back to the base station through wireless signals, so that the cooperative transmission of the energy and the information of the whole system is realized. With the development and the reform of the internet of things, at present, the MIMO cannot only meet the requirement of data communication, and can also be used for transmitting energy. Therefore, researches on more urgent and complicated massive MIMO wireless energy transmission, also called MIMO-WET, have become a hot topic at home and abroad.

SUMMARY

The present application is intended to overcome the above-mentioned defects in the prior art, and provides a massive MIMO wireless energy transmission method based on dynamic frame transmission, so as to solve the technical difficulty in wireless energy transmission in a massive MIMO system.

The technical solution of the present application is to provide a massive MIMO wireless energy transmission method based on dynamic frame transmission, which comprises the following steps:

controlling, by a base station, each antenna to transmit a pilot signal to a user end in a time-sharing mode by using a set time-sharing pilot frame;

acquiring, by the user end, downlink channel state information from the antennae of the base station to the user end and feeding the downlink channel state information back to the base station; and calculating, by the base station, a precoding matrix based on the downlink channel state information, mapping data from a user layer to an antenna port by using the newly calculated precoding matrix, and performing beam forming calculation with maximization of an energy signal of the user end as a goal.

Compared with the prior art, the method has the advantages that the redesign of the signal synchronization frame is creatively provided on the basis of realizing the normal communication between the base station and the mobile terminal, and the transmission strategy of adaptively maximizing the energy receiving efficiency under the condition of slow fading of a channel is provided. The present application conforms to the protocol and the rule of the modern communication technology, can be further expanded, has high compatibility with the prior art, and overcomes the limitation of the current wireless energy-carrying communication technology.

Other features of the present application and advantages thereof will become apparent from the following detailed description of exemplary embodiments of the present application with reference to the accompanying drawings.

BRIEF DESCRIPTION OF DRAWINGS

The accompanying drawings, which are incorporated in and constitute a part of this specification, illustrate the embodiments of the present application and together with the description, serve to explain the principles of the present application.

FIG. 9 is a diagram of a time-sharing pilot frame sequence according to one embodiment of the present application;

FIG. 10 is a diagram of an energy transmission frame sequence according to one embodiment of the present application;

DETAILED DESCRIPTION OF THE EMBODIMENTS

Various exemplary embodiments of the present application will now be described in detail with reference to the accompanying drawings. It should be noted that: the relative arrangement of the components and steps, the numerical expressions and numerical values set forth in these embodiments do not limit the scope of the present application unless it is specifically stated otherwise.

The following description of at least one exemplary embodiment is merely illustrative in nature and is in no way intended to limit the present application, application thereof or use thereof.

Techniques, methods, and devices known to those of ordinary skills in the relevant art may not be discussed in detail, but the techniques, methods, and devices should be considered as a part of the specification where appropriate.

In all examples shown and discussed herein, any specific value should be construed as exemplary only rather than limiting. Thus, other examples of the exemplary embodiments may have different values.

It should be noted that: like reference numbers and letters refer to like items in the following figures, and thus, once an item is defined in one figure, it does not need to be further discussed in subsequent figures.

In short, the massive MIMO wireless energy transmission method based on dynamic frame transmission provided herein mainly comprises the following steps: designing a time-sharing pilot frame to control each antenna to transmit a pilot signal to a user end in a time-sharing mode; designing a precoding solution; and designing a synchronous capture mode and a dynamic transmission strategy and the like.

In the following description, the TDD radio frame structure is taken as an example to illustrate the design of the time-sharing pilot frame, and a software and hardware experimental simulation platform is used to introduce the communication process and the main improvement points. It should be understood that the idea proposed by the present application is also applicable to current commercial devices, such as base stations and terminal UE.

Figure 1:
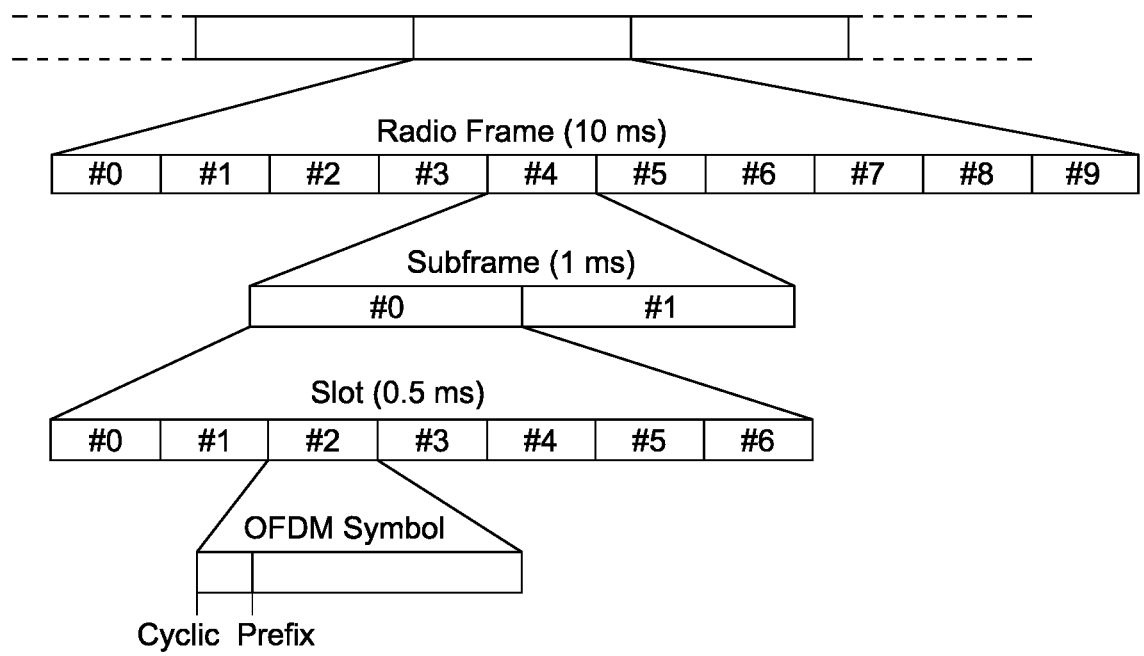
FIG. 1 is a schematic diagram of an OFDM frame structure according to one embodiment of the present application.

FIG. 1 is a schematic diagram of a TDD radio frame structure. There are 100 radio frames per second, and one radio frame occupies 10 ms. Furthermore, each radio frame may be divided into 10 subframes which may be further subdivided into half-frames, each having 7 OFDM symbols, wherein the subframe time is 1 ms and the half-frame time is 0.5 ms. In the standard specification, the TDD frame structure includes DwPTS (Downlink Pilot TimeSlot), DwDTS (Downlink Data TimeSlot), UpPTS (Uplink Pilot TimeSlot), UpDTS (Uplink Data TimeSlot) and Sync (synchronization TimeSlot). According to the specifications of the long term evolution standard, the subcarrier spacing $\Delta f = 15$ KHz, the sampling point of each subcarrier is 2048 (without cyclic prefix), and the time of one sampling point Ts=0.033 microseconds.

Figure 2:
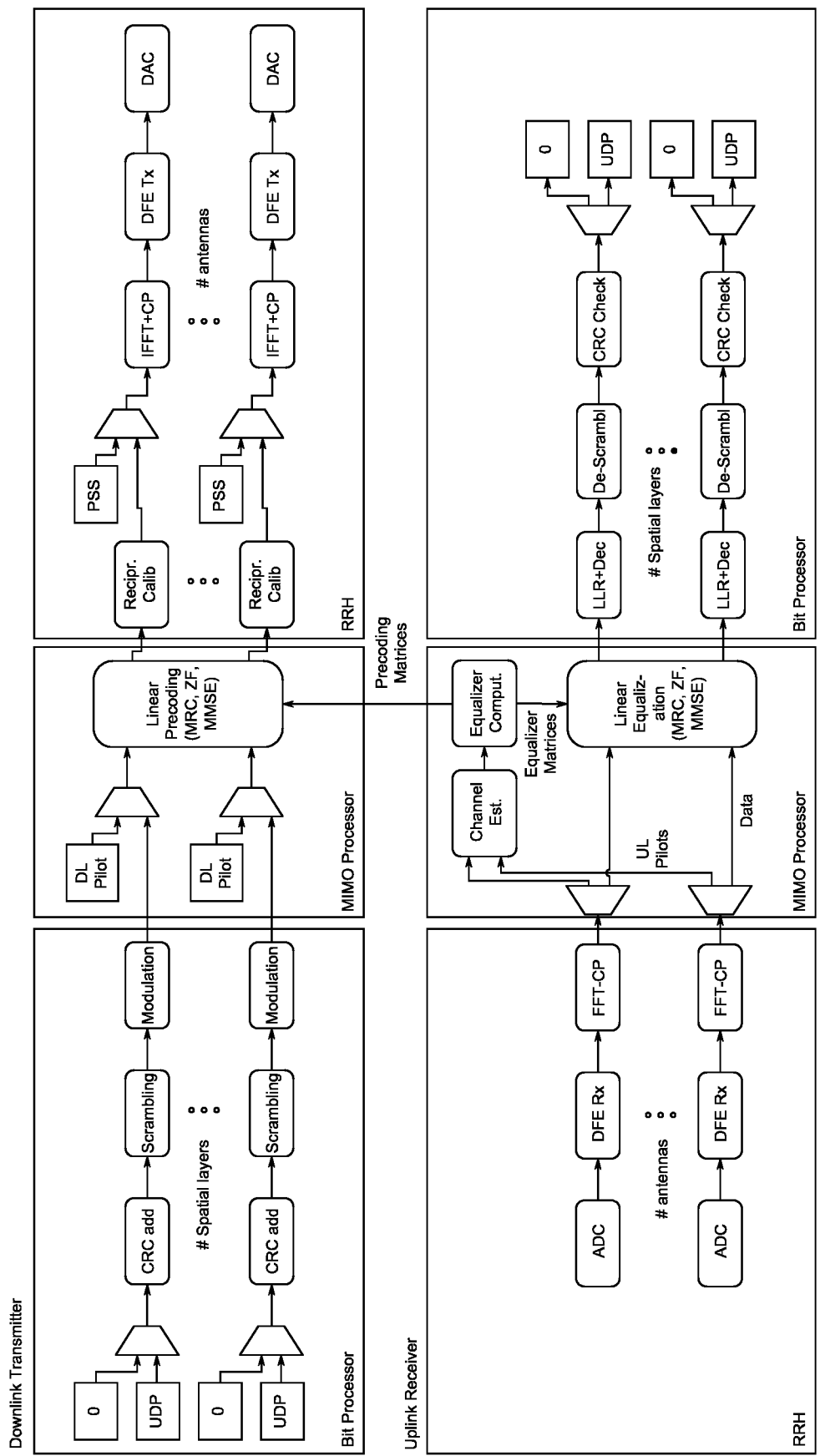
FIG. 2 is a flowchart of the implementation of master computer software according to one embodiment of the present application.
Figure 3:
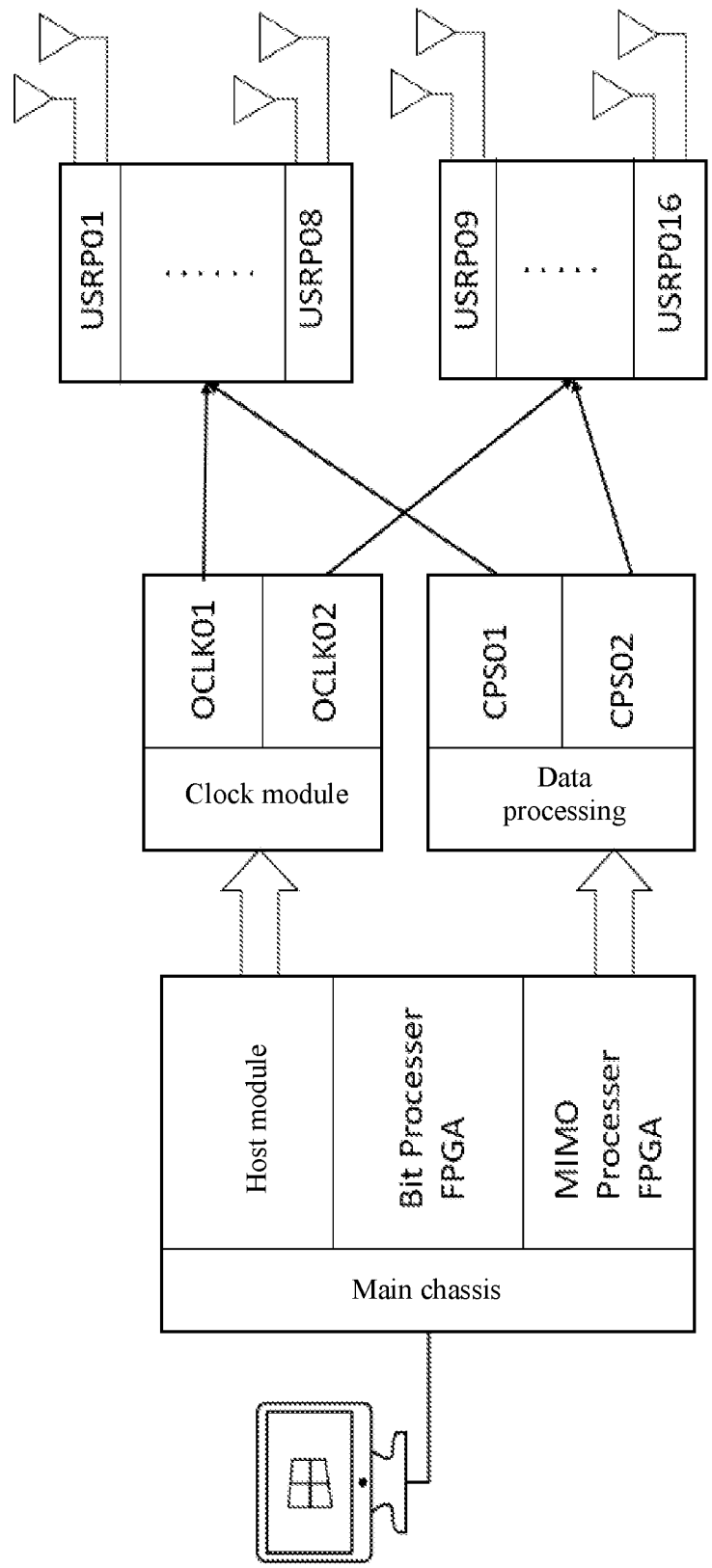
FIG. 3 is a schematic diagram of a hardware system architecture according to one embodiment of the present application.

FIG. 2 and FIG. 3 are software and hardware platforms used herein, respectively, wherein the hardware system mainly includes a host module, a bit processor module, an MIMO processor module, a clock module, a data processing module and the like.

On the downlink (transmission by the base station), the bit processor module is used for coding and modulating data. The MIMO processor is used for precoding IQ data (pilot and modulated source data), and RRH (Remote Radio Head) is used for performing baseband modulation on the precoded data, modulating the precoded data into a baseband signal by using an OFDM technology and finally transmitting the baseband signal in an antenna array.

On the uplink (reception by the base station), the various modules handle similar tasks. In the MIMO processor module, the base station receives the pilots and then carries out channel estimation, and sends the calculated equalization matrix to the MIMO processor in the downlink, namely, the uplink state information is used, and the precoding modulation based on the channel reciprocity acts on the downlink.

In one embodiment, a massive MIMO communication platform device provided by Texas instruments in the United States is used for building and testing an actual communication environment, a wireless energy transmission process of massive MIMO is implemented on the basis of an LTE protocol stack, and modification and optimization are performed on the LTE protocol stack aiming at wireless energy transmission, including modification of precoding, dynamic adjustment of a time strategy, feedback of downlink channel state information and the like. The specific operation is shown in FIG. 2.

1) An experimental platform is equipped with the hardware connection and the software environment, the system building link is verified reliably by using a massive MIMO application example of NI, and the verification is performed from aspects of constellation diagrams, OFDM symbol power, channel impulse response, symbol delay, received subcarrier amplitude, signal delay and the like. The related communication algorithm can be implemented by adopting an FPGA, for example, a communication flow on the FPGA Layer is moved to a master computer for calculation, massive MIMO basic communication based on OFDM modulation of an LTE protocol stack is implemented in the master computer, the processes of coding, interleaving, scrambling, modulation, layer mapping, precoding and the like are carried out on a byte stream downloaded from a network layer at a data link layer, after an OFDM symbol is generated, a direct current (DC) subcarrier is inserted, inverse fast Fourier transform (IFFT) is performed and a cyclic prefix (CP) is inserted, then the OFDM symbol is transmitted from an antenna port, and finally a synchronous symbol is designed to replace the original synchronous symbol of the LTE, so that the master computer at a receiving end can synchronize a signal frame more easily.

2) Under the basis of massive MIMO basic communication based on OFDM modulation of an LTE protocol stack, the LTE protocol is subjected to customized modification aiming at wireless energy transmission, channel reciprocity is not used, downlink time-sharing antenna pilot transmission is used, that is, a base station transmits pilot signals to a user end through time-sharing control of each antenna, the user end acquires downlink channel state information from the antennae of the base station to the user end, wherein the channel state comprises channel information from each antenna of the base station to the user end, the channel state information of a downlink is fed back to the base station, for example, in a network cable mode, the base station calculates a precoding matrix by using a set precoding solution after acquiring the channel state information, data are mapped to an antenna port from a user layer by using the newly-calculated precoding matrix, and then, a signal frame strategy is adjusted according to the energy of wireless electromagnetic signals received by the user end, therefore, the wireless electromagnetic signal energy received at the user end in a certain time is as large as possible, and the wireless energy transmission utilization rate of the channel in unit time is higher.

3) The conventional precoding algorithm based on SVD decomposition is improved, and the power value after passing through a receiving end energy harvesting (EH) module is maximized. Because the energy harvesting impedances of different radio frequency links at the receiving end are different, the impedances need to be calculated to match a proper precoding matrix, so that the energy really acquired at the receiving end is maximized.

The hardware environment and software flow of the application are specifically described below.

I. Hardware Environment

A multi-antenna base station-single/double-antenna mobile terminal system built according to NI mainly comprises a main chassis, a sub-chassis, a clock synchronization module and a USRP-RIO 2950 unit.

Specifically, the main chassis serves as a main data processing module of the base station and a master node for data traffic gathering. Referring to FIG. 3, the main chassis comprises a high-performance bit processor FPGA processing module used for performing CRC check addition, scrambling and descrambling, and QAM modulation and demodulation on IQ signals on a data stream; the high-performance FPGA MIMO processing module is used for pilot addition, channel estimation and precoding algorithm processing; one clock module is used for synchronizing sub-chasses, generating a clock signal of 10 MHz and controlling the triggering of the clock signal. Each sub-chassis comprises 8 USRP- RIOs for gathering and distributing data transmitted by the USRP-RIOs. Wherein, the master computer plate (NI PXIe) of the main chassis is equipped with a Window 10 64 bit operating system connected to mutual peripherals (display screen and keyboard & mouse), and the purpose thereof is as follows: as a master computer, setting initialization of system parameters, displaying various parameters and data charts in the running process in real time, running and debugging the LabVIEW program, and finishing the interaction of software and hardware; displaying the current state of the MIMO system for users, processing data with low instantaneity requirements, and comparing whether the result calculated by the FPGA module is correct or not; and writing, debugging and compiling the FPGA program, wherein a bit file compiled by a specified FPGA program can be loaded when the system is initialized.

For a clock trigger controller, a high-performance 10-MHz oven controlled crystal oscillator is built in to generate clock signals and trigger signals of the base station system, and also to implement routing among multiple devices in the same NI PXI chassis.

For an FPGA data processing unit, a high-performance FPGA chip of Xilinx is adopted, an FPGA module and a CPS sub-chassis are communicated through high-speed PXI Express, and FPGA programming can be implemented on a hardware circuit in a LabVIEW FPGA environment.

The sub-chassis is mainly used as a center for distributing and gathering USRP-RIO data. FIG. 3 schematically shows that the system comprises two sub-chasses, namely CPS01 and CPS02, wherein each sub-chassis is responsible for gathering data received by 8 USRP-RIO units and then transmitting the data to an FPGA module for calculation, and meanwhile, receiving data transmitted by the FPGA and distributing the data to the 8 USRP-RIOs for transmission.

The clock synchronization module is mainly used for controlling 16 USRPs in the system to carry out clock synchronization and trigger work, and consists of 5 clock distributors and one clock trigger controller which are connected.

For the USRP-RIO units, each consists of 16 USRP-RIO zero intermediate frequency general software radio units and is responsible for receiving, transmitting and processing baseband signals, and each USRP-RIO is provided with a configurable FPGA chip for high-speed data calculation.

Figure 4:
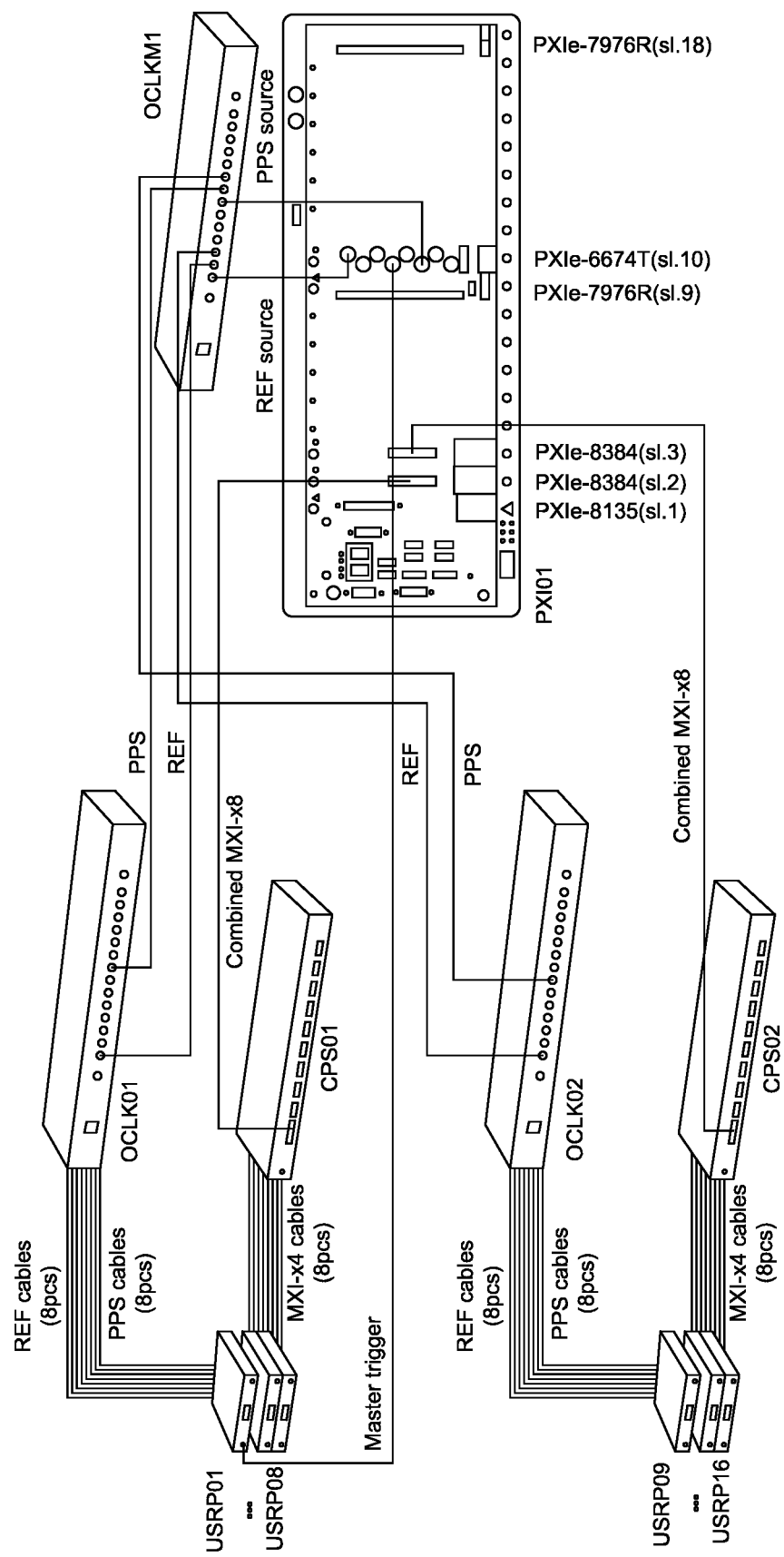
FIG. 4 is a diagram of the 32-antenna massive MIMO connection according to one embodiment of the present application.

The MIMO platform can control two USRP subsystems at most. Each subsystem consists of eight USRP-RIO devices connected to CPS-8910 devices, referred to as CPS01 and CPS02. Clock and synchronous signals received by the USRP subsystem are distributed among the eight USRP-RIO devices in the subsystem by CDA-2990 devices. The CDA-2990 devices in the system are named OCLK01 to OCLK02. FIG. 4 shows a detailed connection diagram of a massive MIMO system, wherein a reference signal (denoted REF), a primary synchronous signal (denoted PPS) and an MXI signal are shown.

II. Software Flow

1) Uplink and Downlink Data Generation

Uplink and downlink payload data are transmitted over a physical shared channel without the need for forward error correction coding to provide uncoded transmission blocks of precise length to a physical layer. In one embodiment, the transmission data are a randomly-generated sequence, a piece of fixed-length random data is generated by using uniform white noise each time, the length being dynamically adjusted according to a modulation mode, the length of the sequence is added to the head part of the data, and finally the CRC code of the sequence is added to the tail part of the data. The length calculation formula is expressed as follows:

$$L_t = \frac{N_{sub} * B_{mod}}{8} \quad (1)$$

wherein $L_t$ is the length of a transmission block, $N_{sub}$ is the number of subcarriers, and $B_{mod}$ is the number of bits of modulation symbols.

Since the protocol adopts 1200 subcarriers for transmission, the lengths obtained by adopting different modulation solutions are shown in Table 1.

TABLE 1

Byte number corresponding to different modulation modes

| Modulation mode | Size of symbol (bit) | Length (byte) |
|---|---|---|
| QPSK | 2 | 300 |
| 16-QAM | 4 | 600 |
| 64-QAM | 6 | 900 |
| 256-QAM | 8 | 1200 |

Figure 5:
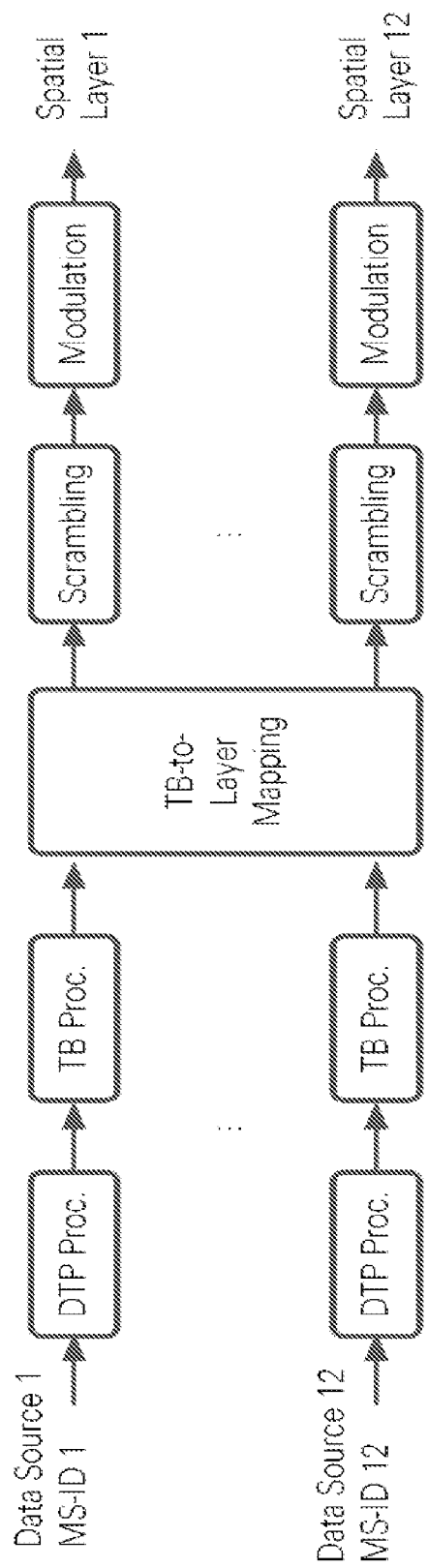
FIG. 5 is a schematic diagram of data mapping from a transmission block to a layer according to one embodiment of the present application.

This framework supports transmission of up to 12 spatial layers, i.e., 12 users, and each mobile station can be allocated a subset of these spatial layers for uplink transmission and downlink reception. Likewise, the base station provides 12 data sources, i.e., 12 random data generators. Each data source is uniquely coupled to a mobile station identified by an MS-ID. Each of up to 12 data sources is assigned its own transmission block processing independently of all other data sources. The generated transmission block is mapped to a spatial layer as shown in FIG. 5. It should be noted that a complete transmission block is mapped to a certain layer before a new transmission block is mapped to another layer, i.e., the transmission block is not split between multiple spatial layers.

2) DC Subcarrier

Figure 6:
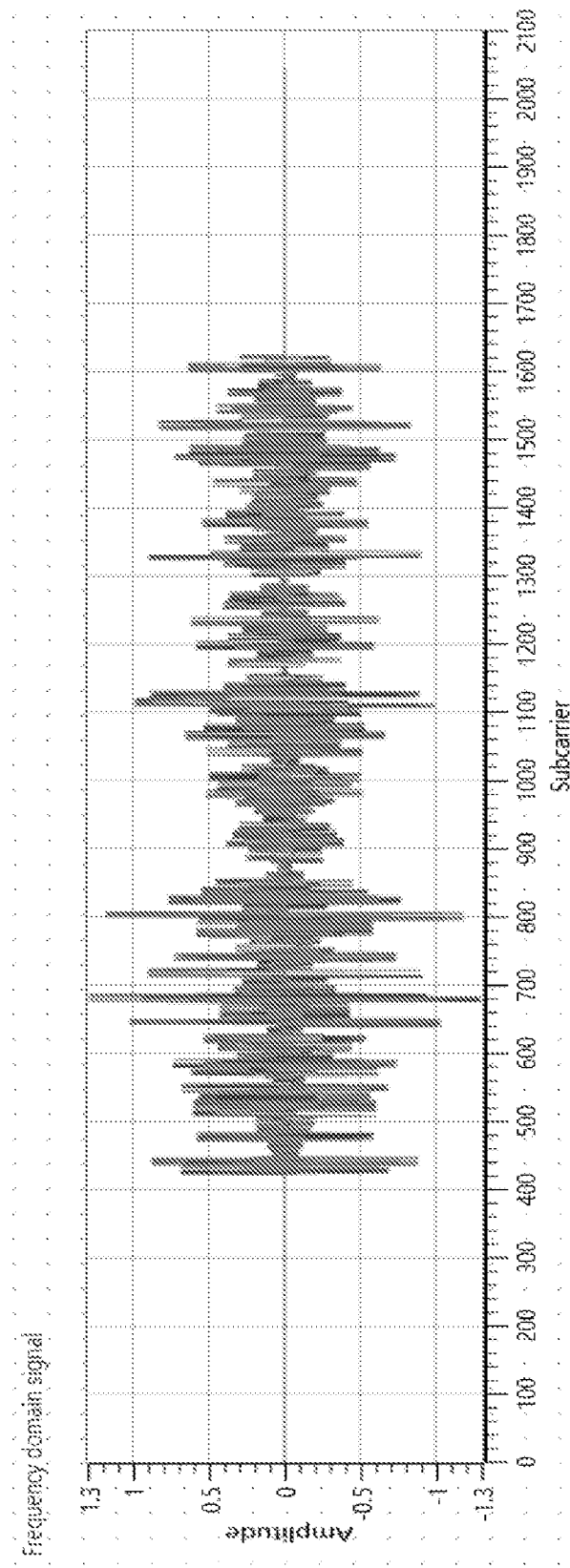
FIG. 6 is a schematic diagram of a frequency domain signal after insertion of a DC subcarrier according to one embodiment of the present application.
Figure 7:
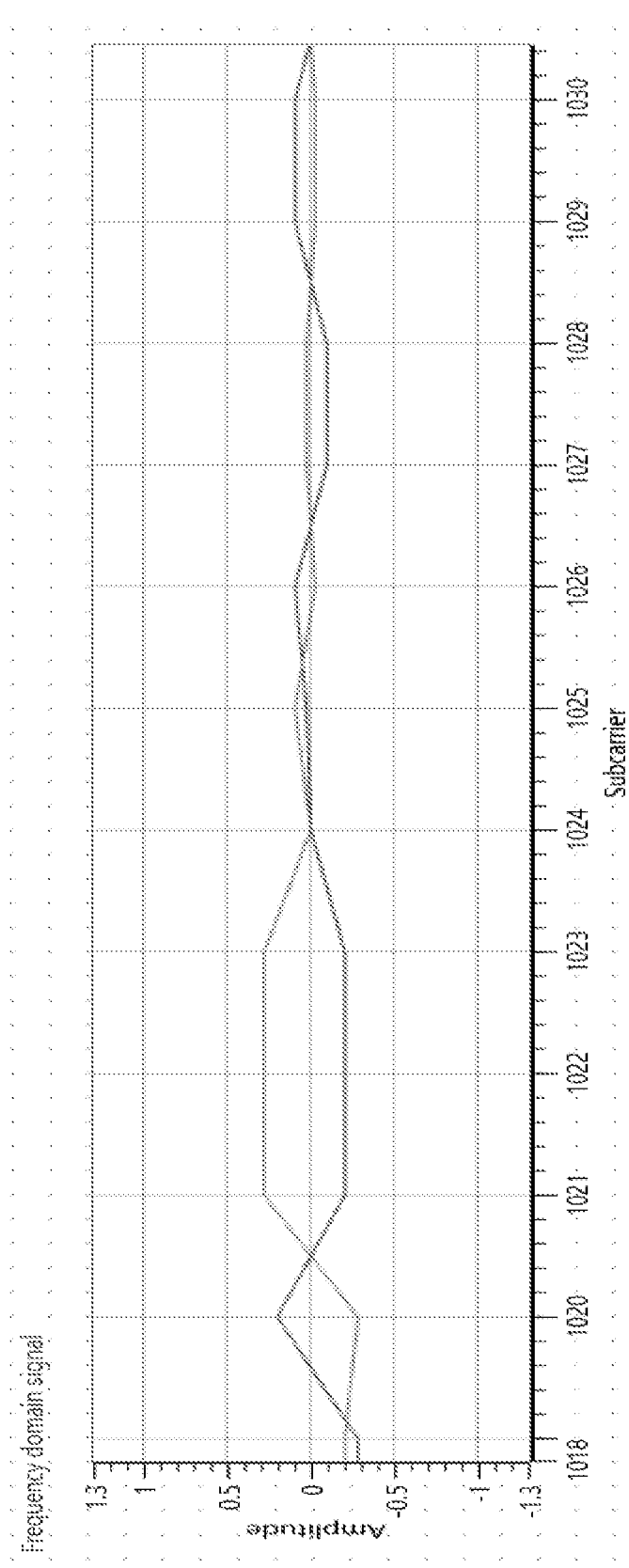
FIG. 7 is a schematic diagram of the insertion of a DC subcarrier into a middle part of a signal according to one embodiment of the present application.

Conventional radio frequency transceiver structures include an intermediate frequency transmitter (one or more intermediate frequency conversions), a zero intermediate frequency transmitter (zero intermediate frequency conversion), a digital transmitter and the like. The transceiver circuit adopted by the USRP-RIO is designed to be a zero intermediate frequency solution, so that a local oscillator leakage is easily caused in an oscillator circuit inside the transceiver, the circuit is called a mixer, an ideal mixer is used for up-converting a baseband signal to a carrier frequency signal, and a signal of the oscillator circuit of the mixer is leaked to an input port or an output port due to some reasons in a real mixer, so that signal distortion at the midpoint of the bandwidth of a transmitted signal is caused. In order to avoid such interference noise, no data modulation is usually added at this frequency point when the signal is preprocessed, that is, the subcarrier signal skips this frequency point, so that it is specified in the LTE protocol that no data symbol is transmitted on this direct current (DC) subcarrier. Besides the midpoint of the carrier frequency bandwidth, guard bands are required to be arranged on both sides of the subcarrier, respectively. The frequency domain signal after the insertion of a DC subcarrier is shown in FIG. 6, wherein the length of the frequency domain signal after the insertion of the DC subcarrier extends from 1200 to 2048, with the signal of the length of 424 to 1624 being data of the modulated subcarrier (except for the midpoint at the length of 1024). At this time, 2048 is the number of sampling points subjected to the inverse fast Fourier transform. FIG. 7 is an enlargement at the midpoint of FIG. 6, and it can be seen that the amplitude of the frequency point at the length of 1024 is 0.

3) Cyclic Prefix

The frequency domain signal of the length of 2048 after the insertion of the DC subcarrier is subjected to inverse Fourier transform, thereby obtaining a time domain signal with the number of sampling points of 2048. However, in an actual communication environment, signals are not all subjected to point-to-point direct transmission in a free space, and when the signals reach an object or a plane, the signals are scattered, so that the signals have a plurality of different paths from a transmitting end to a receiving end according to different geographic environments, resulting in inconsistent arrival times of the signals of the different paths, and in distortion and even destruction due to mutual superposition of the signals. During the channel propagation process of an OFDM symbol, due to the above multipath effect, an adjacent transmitted OFDM symbol is interfered by a multipath signal of a previous symbol, which is called inter-symbol interference (ISI). Generally, two approaches are adopted to address the negative effects of such interference. One is to add a guard interval like inserting a DC subcarrier, and fill 0 at the guard interval, so that when a multipath signal falls within the guard interval, no interference is caused to the following signals; the other is to insert a cyclic signal, and a section of the same signal is copied at the tail part or the head part of the OFDM time domain signal and inserted into the head part or the tail part, thereby realizing the cyclic signal of the OFDM. The first method is not to transmit any signal in a time interval between two adjacent OFDM symbols, and although this method can reduce inter-symbol interference, it still causes inter-carrier interference (ICI) between different subcarriers in an OFDM symbol, thereby destroying the independence between subcarriers.

Figure 8:
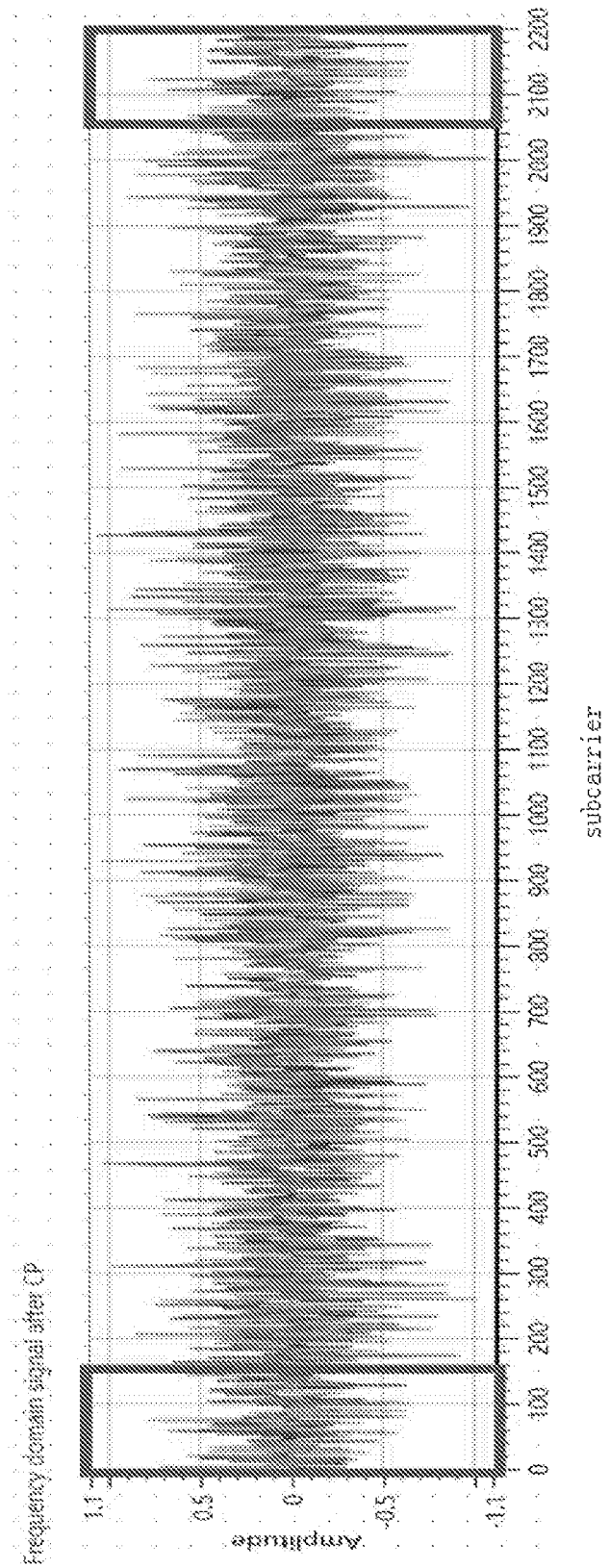
FIG. 8 is a schematic diagram of an OFDM time domain signal added with a cyclic prefix according to one embodiment of the present application.

In the LTE specification, a method for using a cyclic prefix as a guard interval is adopted, the cyclic prefix is obtained by copying a section of sampling points at the tail part of an OFDM symbol time domain signal to the head part, with the length denoted as $T_{cp}$. Therefore, the length of each symbol is updated to be $T_{sym}=T_{sub}+T_{cp}$, wherein $T_{sub}$ is the number of subcarriers in the data part, and the value of $T_{cp}$ is larger than the value of the multipath time delay, so that the multipath signal falls within the guard interval of the cyclic prefix period, and the inter-symbol interference of two adjacent OFDM symbols caused by multipath effect can be avoided as much as possible. As shown in FIG. 8, for OFDM time domain signals with cyclic prefix added, it can be seen that the head part and the tail part of the signal are the same.

4) Data Scrambling

After the data are coded, the data scrambling is carried out, and the scrambling has the functions of reducing interference on other wireless communication terminals, further discretizing the coded data stream in order to disorder the coded data stream, performing spread spectrum in some communication technologies, and encrypting the data to a certain extent to prevent the information leakage caused by eavesdropping. The scrambled signal has randomization in both the time domain and the frequency domain. In one embodiment, a pseudo-random PN sequence is adopted, and the transmitted transmission block is scrambled with the pseudo-random sequence on the basis of each OFDM symbol to provide security against eavesdropping.

For example, the scrambling sequence is defined by a Gold sequence of a length of 31, and a sequence c(n) of a length of $M_{PN}$ is defined as follows:

$$c(n)=(x_1(n+N_c)+x_2(n+N_c))\bmod 2 \; x_1(n+31)=(x_1(n+3)+x_1)\bmod 2 \; x_2(n+31)=(x_2(n+3)+x_2(n+2)+x_2(n+1)+x_2(n))\bmod 2 \quad (2)$$

wherein $N_c=1600$, $0\leq n\leq M_{PN}-1$.

The first m-sequence is initialized as $x_1(0)=1$, $x_1(n)=0$, $1\leq n\leq 30$. The second m-sequence is initialized as $c_{init}=\Sigma_{i=0}^{30}x_2(i)\cdot 2^i$. The scrambling sequence is initialized at the beginning of each OFDM symbol, with an initialization value expressed as $c_{init}=n_1\times 2^{23}+n_2\times 2^7+n_3\cdot 2^3+n_4$.

Wherein, $n_1$ represents OFDM symbol codes 0-139 with a length of 8 bits; $n_2$ represents 0 with a length of 16 bits; $n_3$ represents spatial layers 0-11 with a length of 4 bits; 4 represents modulation types (1 is QPSK, 2 is 16-QAM, 3 is 64-QAM, and 4 is 256-QAM) with a length of 3 bits.

5) Time-Sharing Pilot Design

In an LTE protocol communication system, channel estimation is calculated based on channel reciprocity. In radio frame design, the uplink signal and the downlink signal are transmitted in a time division multiplexing mode, and because there is a sufficiently long channel coherence time between these two signals, the uplink and downlink channels can be assumed to be the same, with the characteristic of perfect alignment of the transmitting and receiving radios, so that the downlink precoding matrix is calculated using the channel state estimated from the uplink pilot. The method based on channel reciprocity is a compromise solution made for reducing overhead brought by downlink channel estimation and ensuring communication rate.

In the platform provided herein, since the downlink channel state and the downlink energy transmission are concerned, the channel state needs to be estimated by sending downlink pilots, and the channel state acquired at the user end is fed back to the base station in a network cable manner. In this way, the base station can acquire a complete downlink channel, and thus a downlink channel state can be obtained accurately.

In order to accurately obtain channel states from each antenna of the base station to all antennae of the user end at the user end, the time-sharing pilot strategy is adopted in the present application, and in an LTE radio subframe, 14 OFDM symbols are included, there are 13 OFDM symbols after the removal of synchronous symbols, but one OFDM symbol is needed for transmitting pilots by one antenna of the base station, so that one subframe is not enough. Therefore, in one embodiment, a time-sharing pilot frame is defined, and as shown in FIG. 9, $N_{bs}$ represents the number of antennae at the base station, and $N_{fl}$ represents the number of energy symbols. For example, the time-sharing pilot frame includes three subframes of LTE radio, collectively including 42 OFDM symbols, and can be used for time-sharing pilot transmission of 32 antennae at the base station. All signal frames described below refer to signal frames newly defined, not the LTE radio subframes.

The time-sharing pilot frame defines the $0^{th}$ OFDM symbol as a synchronous frame, and then the $1^{st}$ OFDM symbol to the $32^{nd}$ OFDM symbol are used for time-sharing pilot transmission of 32 antennae; the $33^{rd}$ OFDM symbol is empty, and a blank gap is inserted for distinguishing the transmission pilot and the transmission energy; the $34^{th}$ OFDM symbol to the $41^{st}$ OFDM symbol are used for energy transmission, and in order not to destroy the orthogonality between the OFDM symbols, the contents of the OFDM symbols with the transmitted energy are generated using PN pseudo random sequence random data.

It should be understood that the number of radio frames included in the time-sharing pilot frame, and the symbol position and the like used for energy transmission may be defined according to actual needs, for example, the number of antennae at the base station and energy transmission efficiency. The present application is not limited thereto.

6) Precoding Design

The number of antennae at the base station is set as $N_{bs}$, the number of antennae at the user end is set as $N_{ue}$, and the number of subcarriers of OFDM symbols is set as $N_{sub}$. In one embodiment, their values are set as $N_{bs}=32$, $N_{ue}=2$ and $N_{sub}=1200$. In the design of time-sharing pilot transmission, a user end receives time-sharing pilot signals of $N_{bs}$ antennae of a base station, so that the user end performs channel estimation on the $N_{bs}$ pilot signals to obtain a three-dimensional channel state matrix of $N_{bs}*N_{ue}\cdot N_{sub}$. Since the dimension of the state matrix is too large, the data volume increases along with the increase of the number of the antennae of the base station and the user end, if uplink transmission is used, a large amount of delay is caused, and under the condition that the uplink transmission is not suitable for being used, channel information can be fed back to the base station through a network cable.

In order to maximize the energy signal of the user end, the base station needs to perform beamforming calculation through the channel state matrix fed back by the user end, and the calculated precoding solution may adopt an algorithm for maximizing the energy based on singular value decomposition (SVD) proposed in the existing literature. A specific precoding calculation solution is explained below.

For each subcarrier j, $1 \leq j \leq N_{sub}$, the channel states are a matrix of $N_{bs}*N_{ue}$. Singular value decomposition is performed on each H; to obtain a right singular matrix $V_j$, a first column of each $V_j$ is taken to obtain a column vector $\vec{v_j}$ with a dimension of $N_{bs}$, the column vectors $\vec{v_j}$ corresponding to all subcarriers are combined to obtain a precoding matrix W with a dimension of $N_{bs}*N_{sub}$, and then the precoding matrix W is applied by the base station to a signal to be transmitted to implement a precoding process.

7) Synchronous Capture

Due to the characteristics of large calculation amount and instantaneity requirement of massive MIMO communication, the data supposed to be calculated by an FPGA are calculated by the master computer, and thus the hardware configuration and software algorithm optimization of the master computer are greatly tested. The conventional synchronization method for synchronous frames is a maximum likelihood algorithm, and the calculation of a large number of synchronous signals by adopting the master computer is very time-consuming, so that the synchronous symbol of the LTE radio frame is redesigned, and the purpose of the design is to enable the mater computer to execute symbol synchronization with a low-complexity calculation amount.

Specifically, the original synchronous symbol in the radio frame is designed, and a direct current square wave is used in the design, so that the receiving end can accurately detect the frame starting point, and then the master computer program can more accurately find the frame starting point in the receiving end by designing a sliding window algorithm. The design of the sliding window algorithm is set forth below.

At the receiving end, continuously-received signals are stored in a buffer area, wherein the number of sampling points of the signals stored in the buffer area at most may be $N_r$. For a section of signals a received in the buffer area, a size of a sampling point of a direct current synchronous signal is set as $N_s$, a size of a sliding window is set as S, and the sliding window slides from the tail part to the head part of the buffer area, and the purpose of doing so is to process a relatively new data frame first, and then relatively new channel state information can be further obtained. While the sliding window slides reversely, the average value $V_k$ of signal amplitude values within the window is calculated, wherein $0 \leq k \leq N_r - N_s$, and k is an initial position of the sliding window in the buffer area. The calculation formula of the average amplitude value $V_k$ of the sampling points within the sliding window is expressed as follows:

$$V_k = \frac{\sum_{i=0}^{S} |a_k + i|}{S} \quad (3)$$

wherein the size of the sliding window needs to satisfy the constraint condition of $0 < S \leq N_s$.

Since the average amplitude value $V_k$ can only measure the average amplitude value of the sampling points within the window, the average amplitude value $V_k$ is not enough to measure whether the current position of the sliding window is the designed direct current synchronous symbol or not, if the sliding window needs to be determined to be a direct current signal, a floating threshold value ρ needs to be set, and when the difference value between the sampling points within the window and the average amplitude value within the window does not exceed the floating threshold value ρ, the synchronous symbol can be positioned. For example, $g_k$ is defined whether the current window is a synchronous symbol or not, and the calculation formula is expressed as follows:

$$g_k = \begin{cases} 1, & \text{if } \max\{||a_{k+i}| - V_k|\} < \rho \\ 0, & \text{if } \max\{||a_{k+i}| - V_k|\} > \rho \end{cases} \quad (4)$$

$$\text{s.t. } i \in \{0, S-1\}$$

When $g_k=1$, the position of the current sliding window is considered the synchronous signal position of one frame, then the starting point k of the sliding window falls on a certain point of the synchronous direct current signal, and one-dimensional reverse search is carried out forward based on this point k, and when $|a_s| \leq \theta$, $0 \leq s \leq k-1$, the point s falls on the starting point of the synchronous symbol. On the contrary, when $g_k=0$, it is indicated that the position of the window is not the synchronous symbol, then the sliding window continues to move forward.

In addition, a threshold value θ of the lowest average amplitude value is set for pruning when the sliding window slides, so as to reduce the operation amount. For a window with an average amplitude value $V_k < \theta$, no calculation of $g_k$ is performed, this is because the position of the current window is not the position of the synchronous signal. For the average amplitude value within the window $V_k \geq \theta$, the position of the sliding window is considered probably the synchronous signal, and then the calculation of $g_k$ is carried out. In particular, θ optimizes the data calculated when the sliding window slides which are unlikely to be a synchronous signal.

8) Channel Estimation

The channel estimation is implemented in the frequency domain, which relies on frequency orthogonal pilots transmitted in the uplink and downlink, respectively, but the uplink pilots are designed to be orthogonal in frequency for each antenna, while the downlink pilots are designed to be orthogonal in frequency for each spatial layer. The downlink pilot is transmitted by precoding, similar to the actually transmitted data. Therefore, the acquisition of the channel state information is a huge calculation amount, and the channel state information needs to be calculated in real time through pilots in the communication process, especially for massive MIMO communication, due to the existence of a large number of antenna arrays, the calculation amount of channel state information acquired by the massive MIMO is very large and complicated.

Taking the LTE protocol stack as an example, 140 OFDM symbols are transmitted per second, and the pilots occupy about 20% of symbols in one frame, which indicates that when a communication terminal adopts LTE protocol stack communication, about 40 pilots per second need to be subjected to channel estimation calculation, with the addition of a large number of antenna arrays, the data amount is large, so that channel estimation needs a simple algorithm with low time complexity and low space complexity, which can quickly calculate channel state information and estimate channel state information accurately as much as possible, thereby achieving channel calculation with rapidness and low error. In an OFDM system, the widely-used method is least square (LS) estimation, and the formula thereof is as follows:

$$H_{LS} = YX^{-1} = H + \frac{n}{X} \quad (5)$$

wherein Y is a received signal, n is noise, and X is a pilot signal.

Least square estimation is widely used in channel estimation, and because the operation complexity is low, the corresponding channel coefficient can be estimated by only one multiplication, so that the method is very suitable for massive MIMO channel state calculation.

9) Dynamic Transmission Design

Although the energy is transmitted through the time-sharing pilot frame, the transmission time of time-sharing pilots occupies 76.2% of the time of one signal frame, and the time of energy transmission is only 19% of the time of one signal frame. With the increase of the number of antenna arrays of the massive MIMO, the use of the method can lead most of the time of signal transmission to be used for the transmission of time-sharing pilots instead of energy transmission, so that the occupation time of signal frames in the energy transmission is reduced with the increase of the number of antennae of the massive MIMO, which is worse under the condition that the wireless remote energy transmission efficiency is not high, thus leading the energy utilization rate of a base station to be low and the time of occupying a channel to be long. Therefore, the present application preferably provides an improved signal frame structure to increase the energy transmission efficiency of signal frames.

Specifically, a dynamic transmission strategy is proposed, and an energy transmission frame structure is newly added on the basis of the time-sharing pilot frame structure, and as shown in FIG. 10, the time-sharing pilot frame includes pilot symbols and energy symbols, and the energy transmission frame is composed of only energy symbols. For convenience of description, the time-sharing pilot frame is named as frame (1) and the energy transmission frame is named as frame (2) hereinafter. Assuming that $N_f$ represents the number of energy symbols in the $f^{th}$ (f>0) signal frame, when the signal frame (1) is transmitted, $N_f = N_{f1}$, and $N_{f1}$ is the number of energy transmission symbols in the frame (1); when the signal frame (2) is transmitted, $N_f = N_{f2}$, and $N_{f2}$ is the number of energy transmission symbols in the frame (2). Furthermore, a size of a sliding frame window is defined as Q, wherein the frame window is used for monitoring a change of an average energy of signal frame energy symbols within the window, and when f≥Q, the average energy $P_f$ of signal frame energy symbols within the window at the $f^{th}$ frame is expressed as follows:

$$P_f = \frac{1}{\sum_{f-Q+1}^{f} N_f} \sum_{f-Q+1}^{f} \sum_{k=1}^{N_f} p_{f,i} \quad (6)$$

Wherein $P_{f,i}$ represents an energy of an $i^{th}$ OFDM energy symbol in the $f^{th}$ frame.

After the average energy $P_f$ of the sliding window at the $f^{th}$ frame is obtained, a change threshold value σ is defined, when an absolute value of a difference value between an energy of each energy symbol of the sliding window at the user end and $P_f$ is smaller than σ, a current channel is considered in a slow fading state at the moment, the peripheral interference and noise are relatively stable, the change speed of the channel state is not very high, and then the estimation of the channel state can be considered to be redundant at this time, this is because the estimation of the channel state is used for calculating beamforming to improve energy transmission as much as possible, other than using the channel state to demodulate data in the conventional communication, the former has less strict requirements on the accuracy of channel estimation compared with the latter, so that the transmission of the time-sharing pilots is not useful in this case, and at this time, a dynamic transmission strategy can be used to switch the frame (1) into the frame (2). On the contrary, when the absolute value of the difference value between the energy of each energy symbol of the sliding window at the user end and $P_f$ is greater than σ, the current channel state is considered to be unstable, which may be caused by the motion of the user end or the change in the surrounding environment, and at this time, the frame (2) is switched into the frame (1), and when the energy value of the unit OFDM symbol is stable again, the frame (1) is switched into the frame (2). The expression of the decision $A_{f+1}$(f≥Q) of the f+$1^{th}$ frame of the above-mentioned dynamic transmission strategy is as follows:

$$A_{f+1} = \begin{cases} 0, & \text{if } \max\{|p_{f,i} - P_f|\} < \sigma \\ 1, & \text{if } \max\{|p_{f,i} - P_f|\} \geq \sigma \end{cases} \quad (7)$$

$$\text{s.t. } i \in \{1, N_f\}$$

When $A_{f+1}=0$, the energy value of the unit OFDM energy symbol within the sliding window of the $f^{th}$ frame does not change much, which indicates that the current channel state is in a slow fading state and can be switched into the signal frame of frame (2); when $A_{f+1}=1$, the change amplitude of the energy value of the unit OFDM energy symbol within the sliding window of the $f^{th}$ frame is significant, which indicates that the current channel state changes, and the channel state needs to be reevaluated and is switched into the signal frame of frame (1).

In order to better show that the dynamic transmission strategy can increase the low energy transmission efficiency of signal frames, the ratio $$R = \frac{T_{energy}}{T_{frame}}$$

is set as the ratio of the energy transmission time to the signal frame transmission time, wherein $T_{energy}$ represents the total transmission time of energy symbols, and $T_{frame}$ represents the total transmission time of signal frames.

To further verify the effects of the present application, the following experiments are performed.

I. Verification of Platform Building

Figure 11:
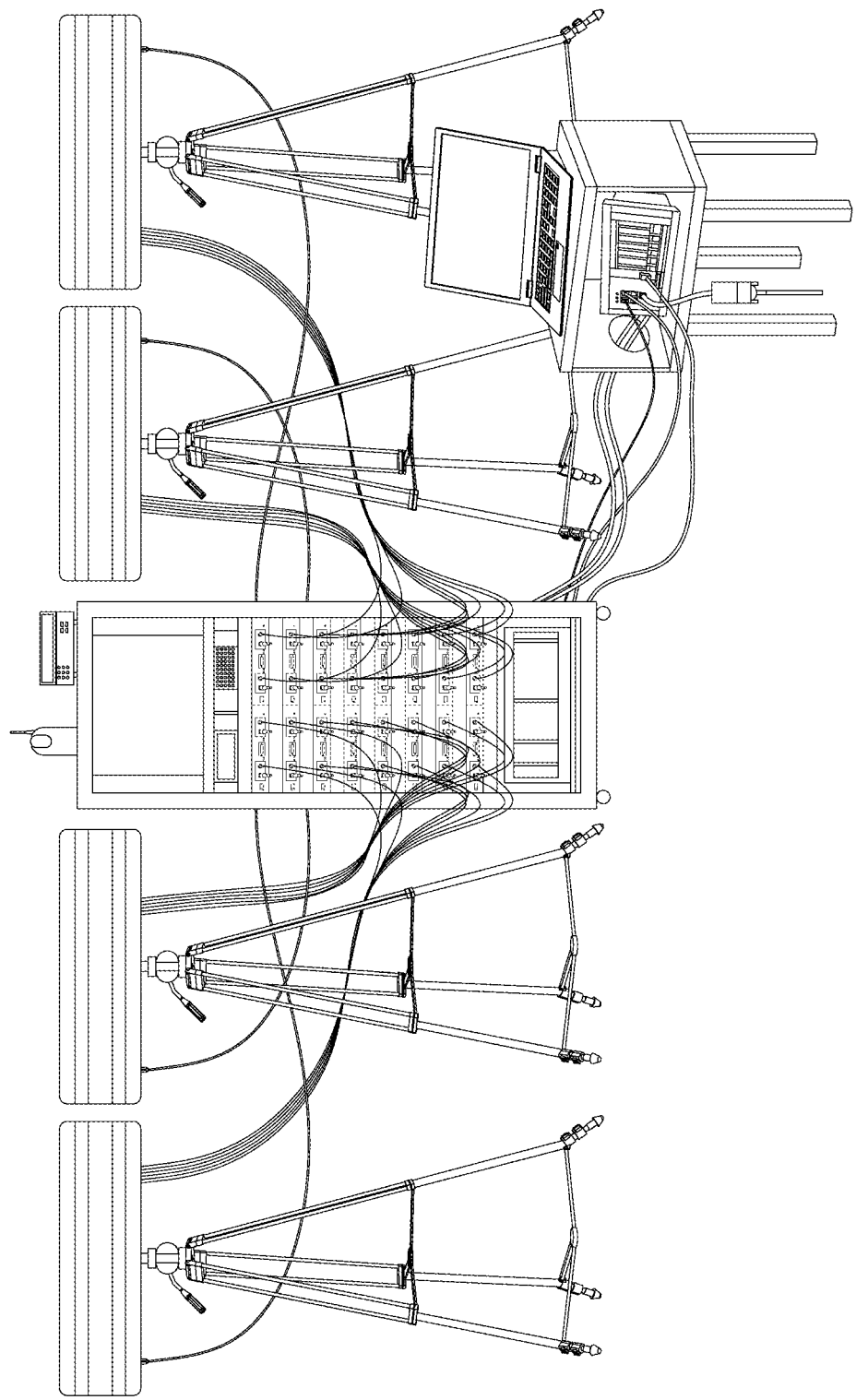
FIG. 11 is a physical diagram of a system and an antenna array of a base station according to one embodiment of the present application.
Figure 12:
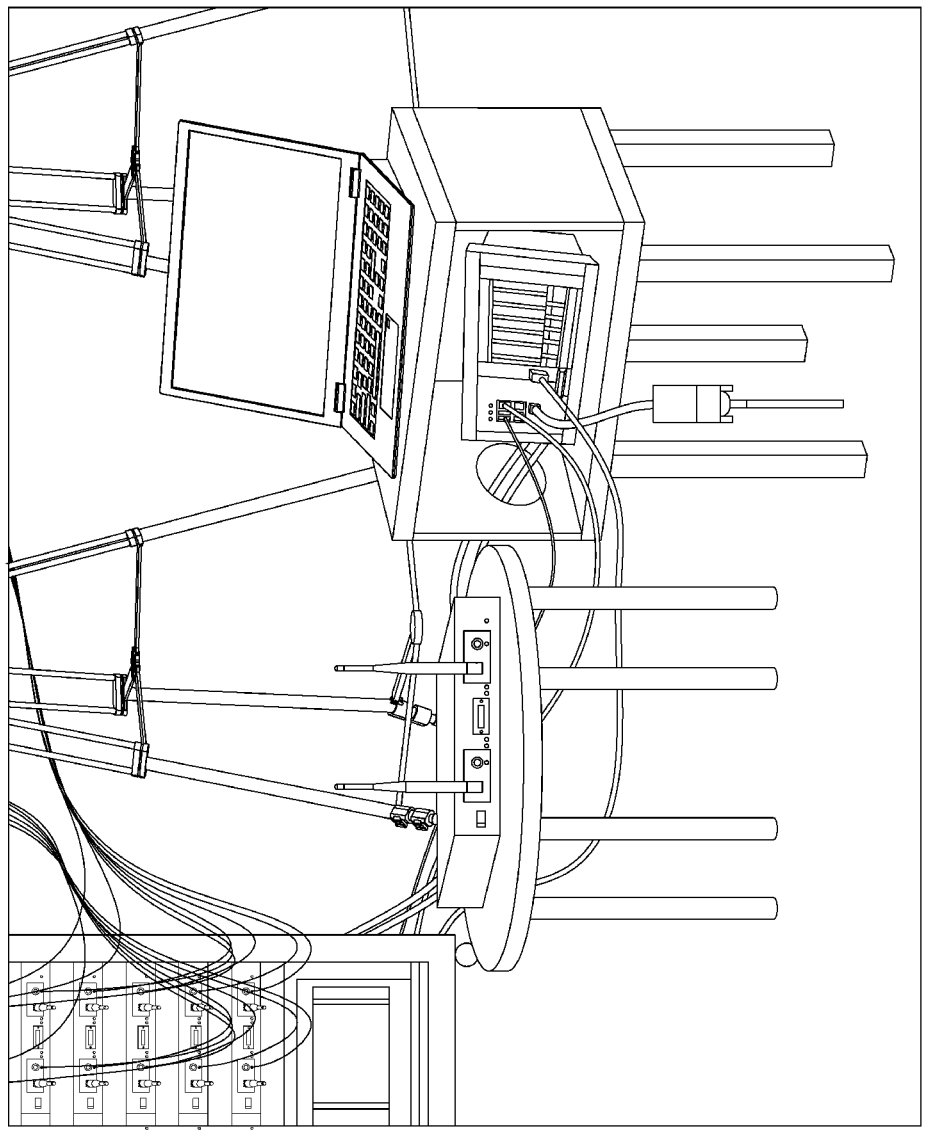
FIG. 12 is a physical diagram of a system of a user end according to one embodiment of the present application.

In system testing, a base station transmits signals by using 32 directional array antennae, and the base station receives signals by using 32 omnidirectional rod-shaped antennae, and because the array antennae are active directional antennae and circuits inside the antennae are provided with a power amplifier, the base station can only transmit signals but cannot receive signals. A user end adopts 2 omnidirectional rod-shaped antennae, and the receiving and transmitting antennae at the user end are integrated. The radio frequency of the base station and the user are both set as 1.2 GHz. A physical diagram of a base station-based system is shown in FIG. 11. A physical diagram of a user end-based system is shown in FIG. 12.

Figure 13:
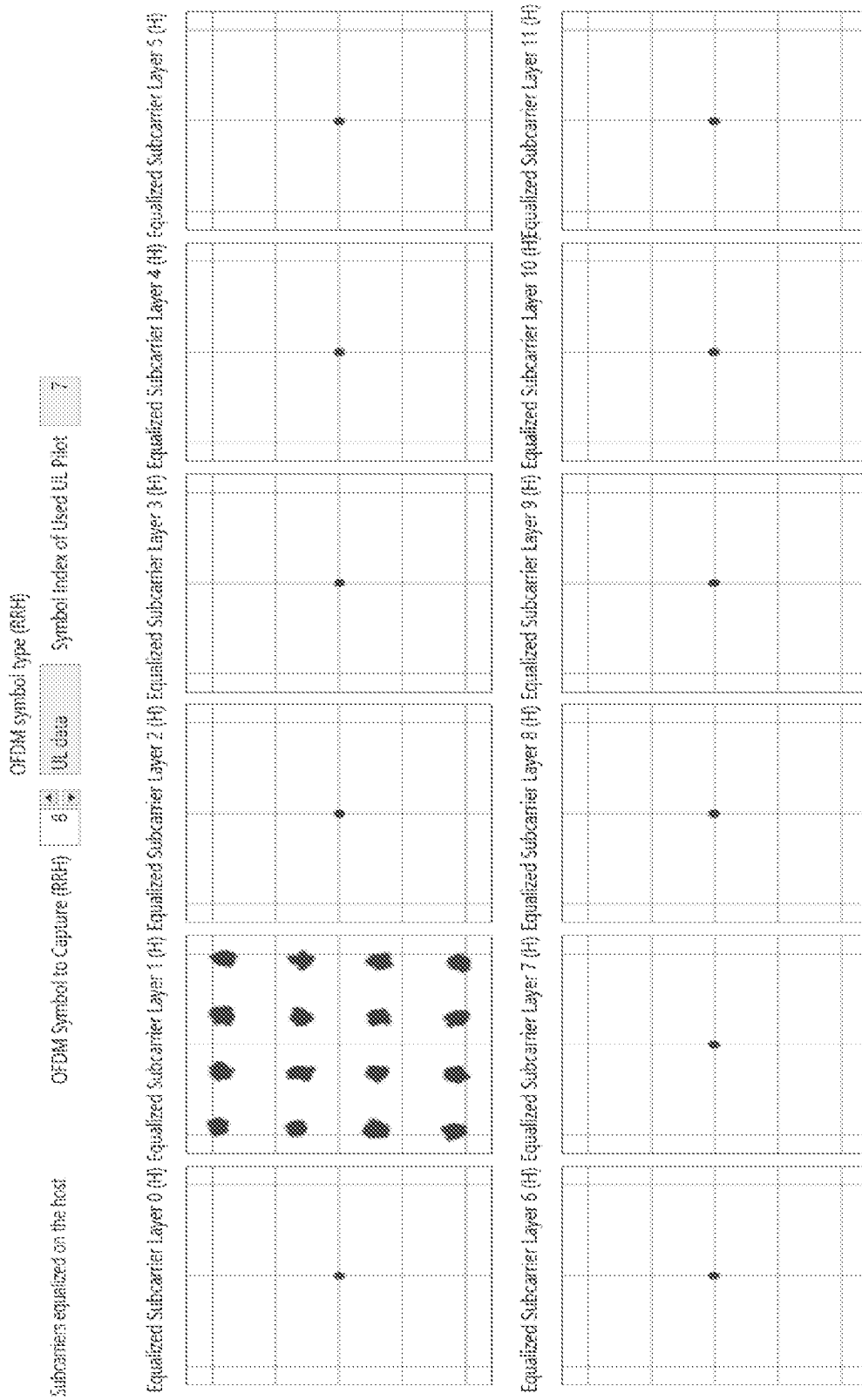
FIG. 13 is a base-station-side uplink constellation diagram according to one embodiment of the present application.
Figure 14:
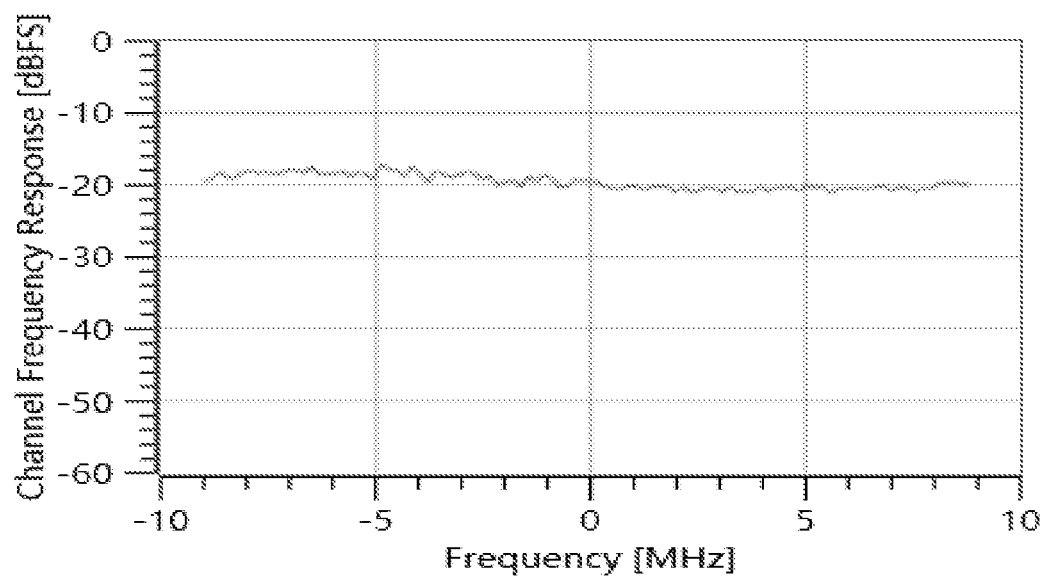
FIG. 14 is a base-station-side channel frequency response diagram according to one embodiment of the present application.
Figure 15:
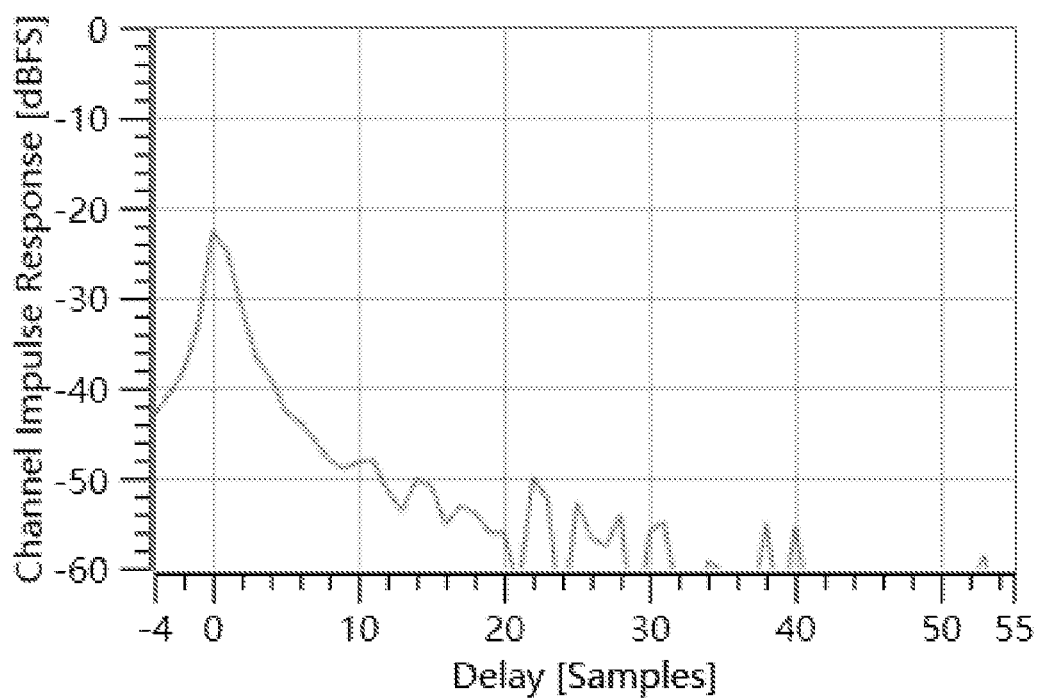
FIG. 15 is a base-station-side channel impulse response diagram according to one embodiment of the present application.

FIG. 13 is a front panel under the LabVIEW communication program, and it can be seen from the figure that there is a user currently sending uplink data, and the data modulation mode is 16 QAM. Since there is no interference from other users, no matter the uplink constellation diagram is observed from the base station side or the downlink constellation diagram is observed from the user side, the transmission state is relatively consistent with the normal transmission state, and although the constellation points of the constellation diagram are concentrated and the system performance is good, the state is not excellent, this is because the receiving and transmitting antennae at the base station are not integrated, and the estimation based on channel reciprocity is performed on channels from the antennae at the user end to the receiving antennae at the base station. It can be seen from FIG. 14 that the channel frequency response at the BS side is relatively flat and uniform in power distribution in a bandwidth region of 20 M, which can also be seen from the frequency impulse response of FIG. 15. Since the transmitting and receiving antennae at the base station are not integrated and the positions of the transmitting and receiving antennae are far apart, under the limitation of the system hardware, the massive MIMO application framework cannot perform channel state estimation of wireless energy communication in a channel reciprocity-based mode.

Figure 16:
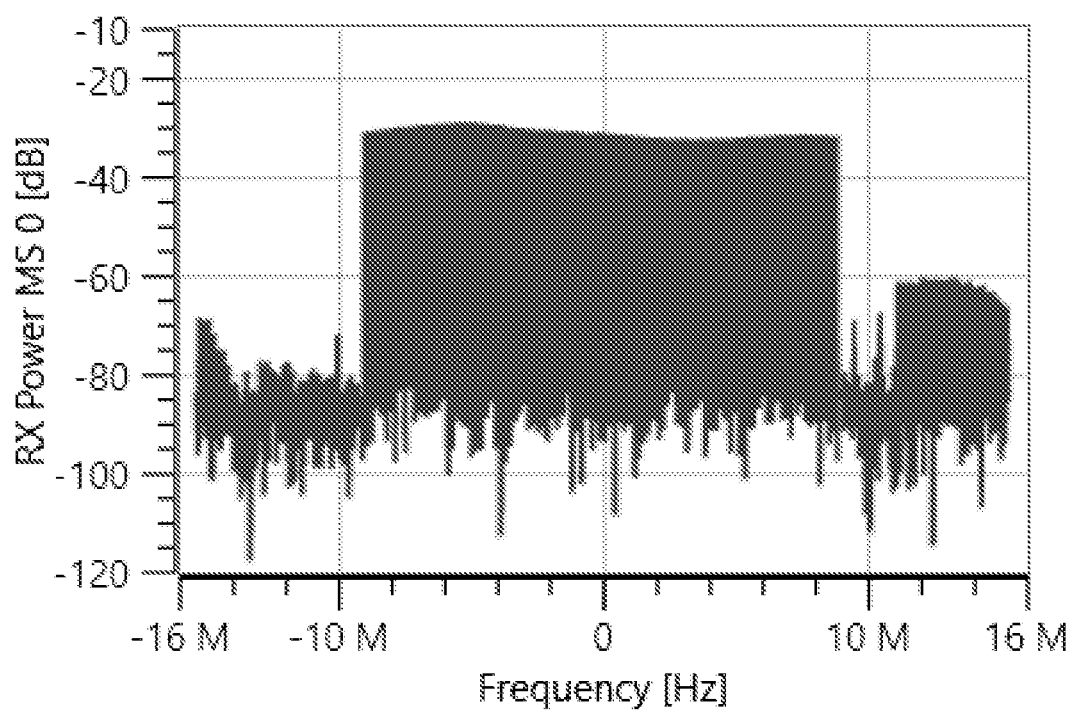
FIG. 16 is a user-side downlink received power spectrogram according to one embodiment of the present application.
Figure 17:
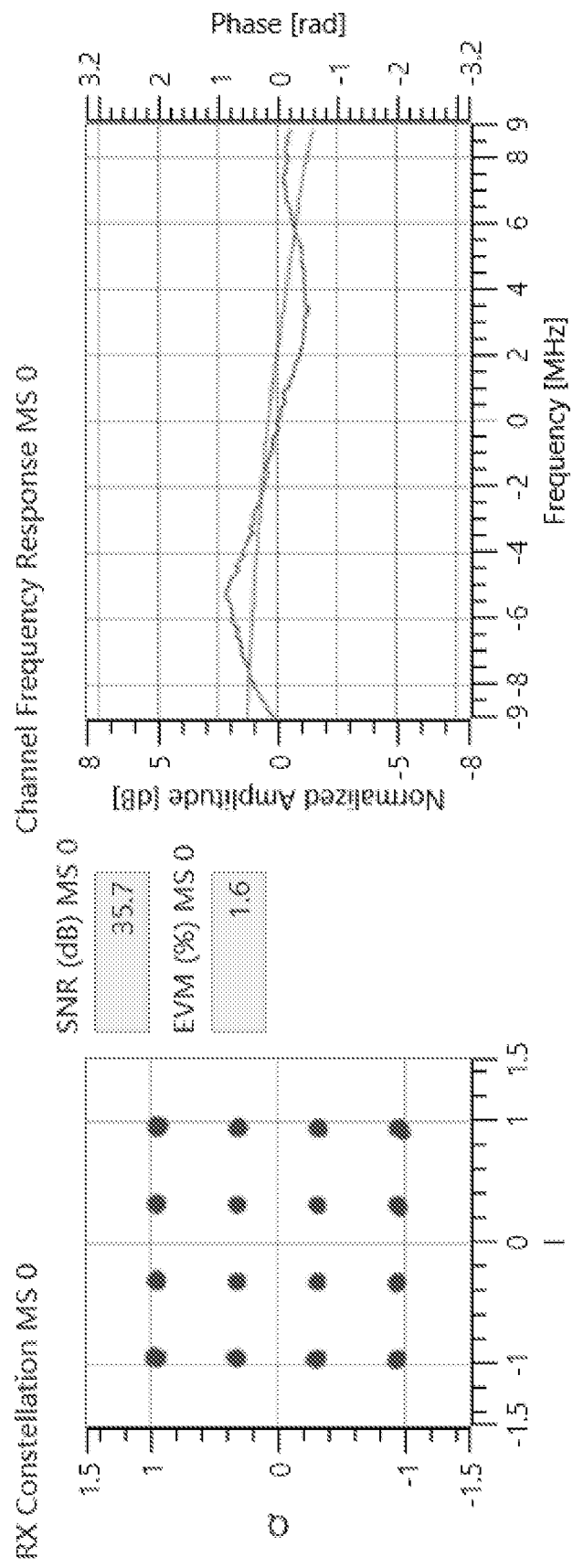
FIG. 17 is a user-side downlink constellation diagram and a frequency response diagram according to one embodiment of the present application.

Compared with the user end, it can be seen from FIG. 16 that the bandwidth of the OFDM subcarrier transmitted from the base station is 20 MHz, and the constellation diagram of FIG. 17 reflects that the massive MIMO multi-antenna array exerts superiority, so that constellation points are very concentrated and the error rate is low, and meanwhile, a frequency response curve under 20 M bandwidth also falls within a good range. The constellation points of the user end are better than those of the base station, this is because the transmitting and receiving antennae at the user end are integrated, the problem of inaccurate channel estimation of the base station does not exist.

II. Verification of Innovative Synchronous Frames

In one embodiment, the carrier frequency is set to 1.2 GHz, the base station adopts 32 directional array antennae, and the user end is equipped with 2 antennae. The size of a buffer area is set as $N_f=64000$, sampling point of a synchronous signal is set as $N_s=2048$, the size of a sliding window is set as s=100, the floating threshold value is set as $\rho=0.0005$, and $\theta=0.015$.

Figure 18:
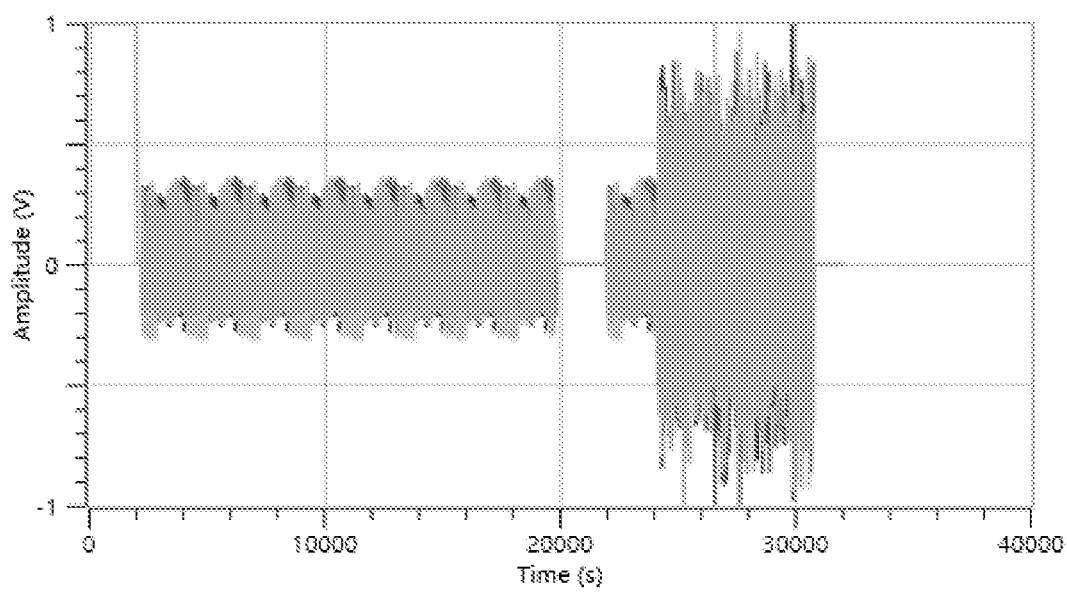
FIG. 18 is a schematic diagram of an LTE frame generated by a transmitting end according to one embodiment of the present application.
Figure 19:
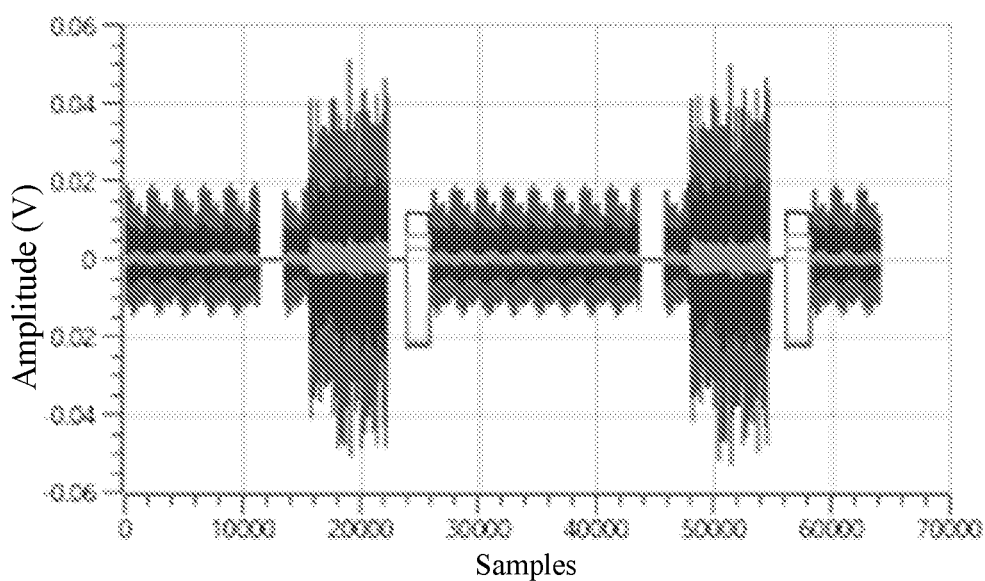
FIG. 19 is a schematic diagram of a user end receiving a real-time LTE radio frame signal according to one embodiment of the present application.
Figure 20:
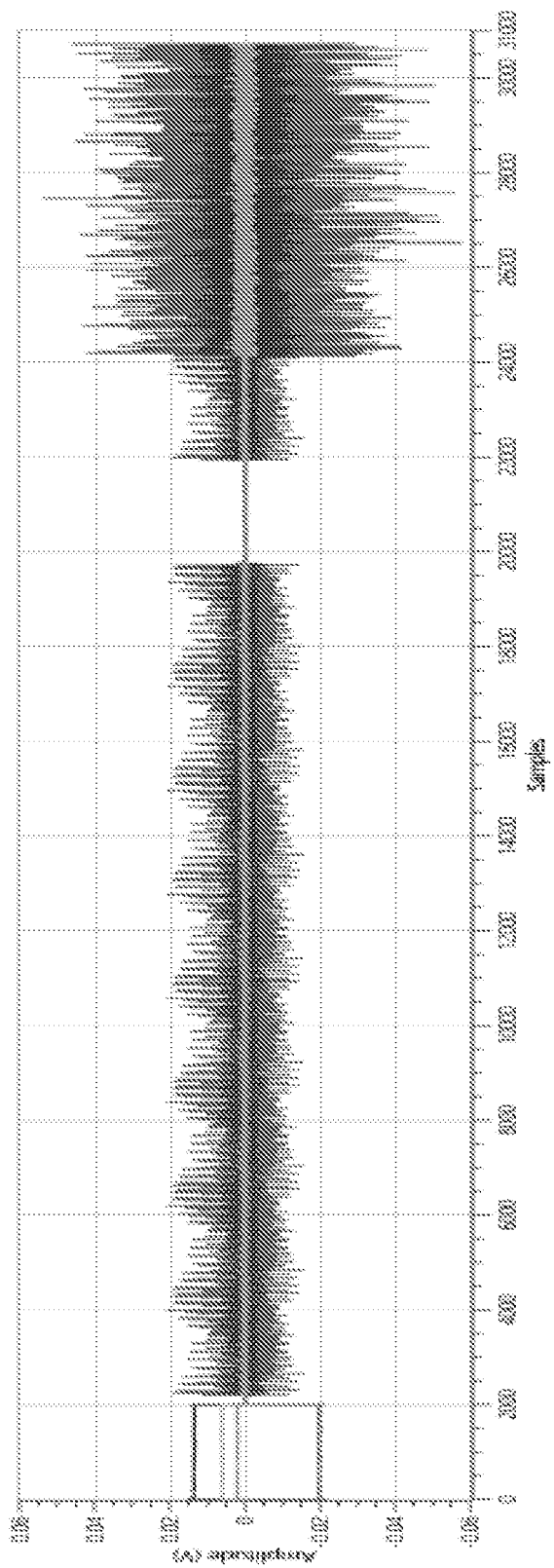
FIG. 20 is a schematic diagram of a user end receiving a radio subframe signal according to one embodiment of the present application.

FIG. 18 shows a radio subframe time domain signal generated at a transmitting end, which has direct current synchronous frames, pilots and energy signals designed in the present application. FIG. 19 is a signal amplitude diagram of a buffer area after signal sampling by a user end, wherein the buffer area has only one complete LTE subframe symbol, this is because the signals are continuously acquired, and the master computer can only process a certain number of sampling points at a time, and the signal sampling rate is set to be relatively moderate in order to ensure the signal processing speed. FIG. 20 shows a time domain signal diagram of a radio subframe captured from the buffer area after the user end adopts a new synchronous signal algorithm, and it can be seen from the figure that the algorithm can accurately and quickly find the starting point of a radio frame from the buffer area. In addition, direct current synchronous signals, downlink pilot signals and energy signals can be seen in the figure. After a radio subframe is acquired, the user end can obtain 14 OFDM symbols in one subframe by removing the cyclic prefix, performing FFT transform and removing DC subcarriers, and then obtain channel state information by performing channel estimation on the pilots.

III. Verification of Adaptive Switching Frames

The experiment is performed on a massive MIMO platform of NI, wherein the number Nis of antennae at the base station is 32 active directional array antennae, and the number $N_{ue}$ of antennae at the user end is 2 omnidirectional rod-shaped antennae. The communication carrier frequency of the base station and the user end is set to be 1.2 GHz when the maximum gain of the active array antennae is 21.71 dB, so that beam forming can be better carried out, and the signal energy radiated to the receiving end is more concentrated. The number of energy symbols of the time-sharing pilot frame is $N_{f1}=8$, the number of energy symbols of the energy transmission frame is $N_{f2}=41$, and the size of the sliding window is Q=20. The height of array antennae at the base station is 1.6 meters, the height of antennae at the user end is 0.4 meters, the horizontal distance between two terminal antennae is 15 centimeters, and the positions of the base station and the user end are fixed in the communication process.

Figure 21:
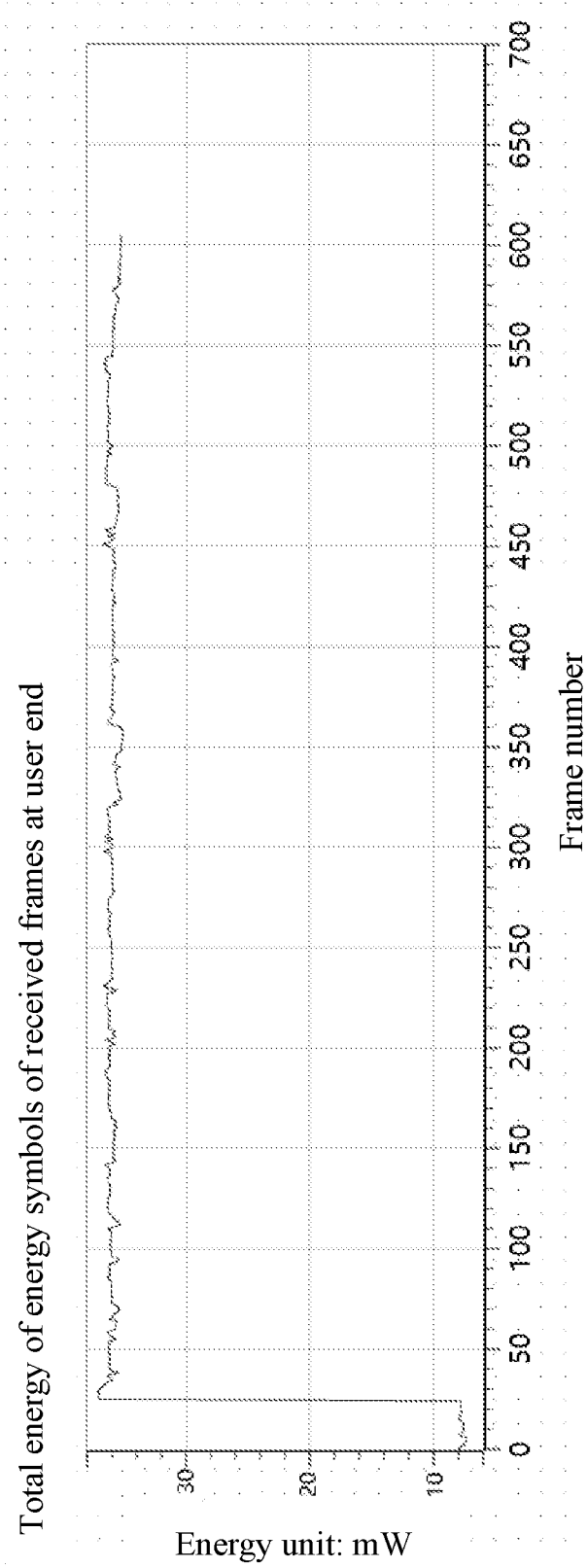
FIG. 21 is a diagram of the total energy of energy symbols of each frame received by the user end according to one embodiment of the present application.
Figure 22:
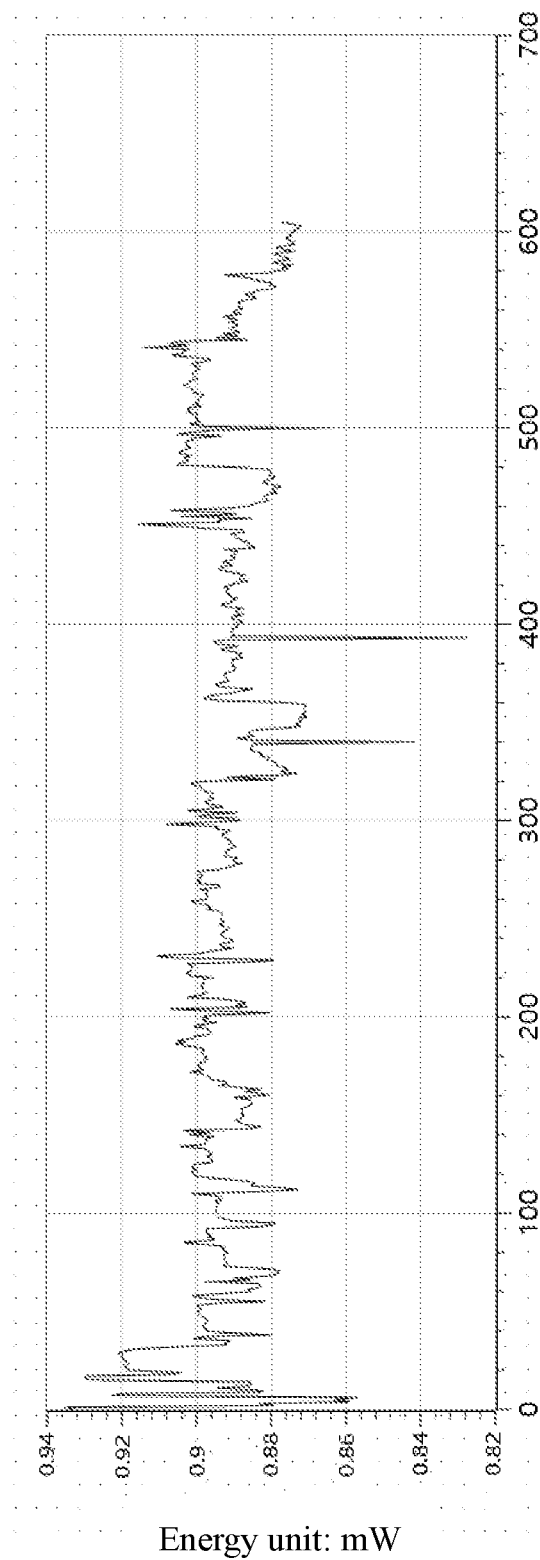
FIG. 22 is a schematic diagram of average energy at the user end according to one embodiment of the present application.
Figure 23:
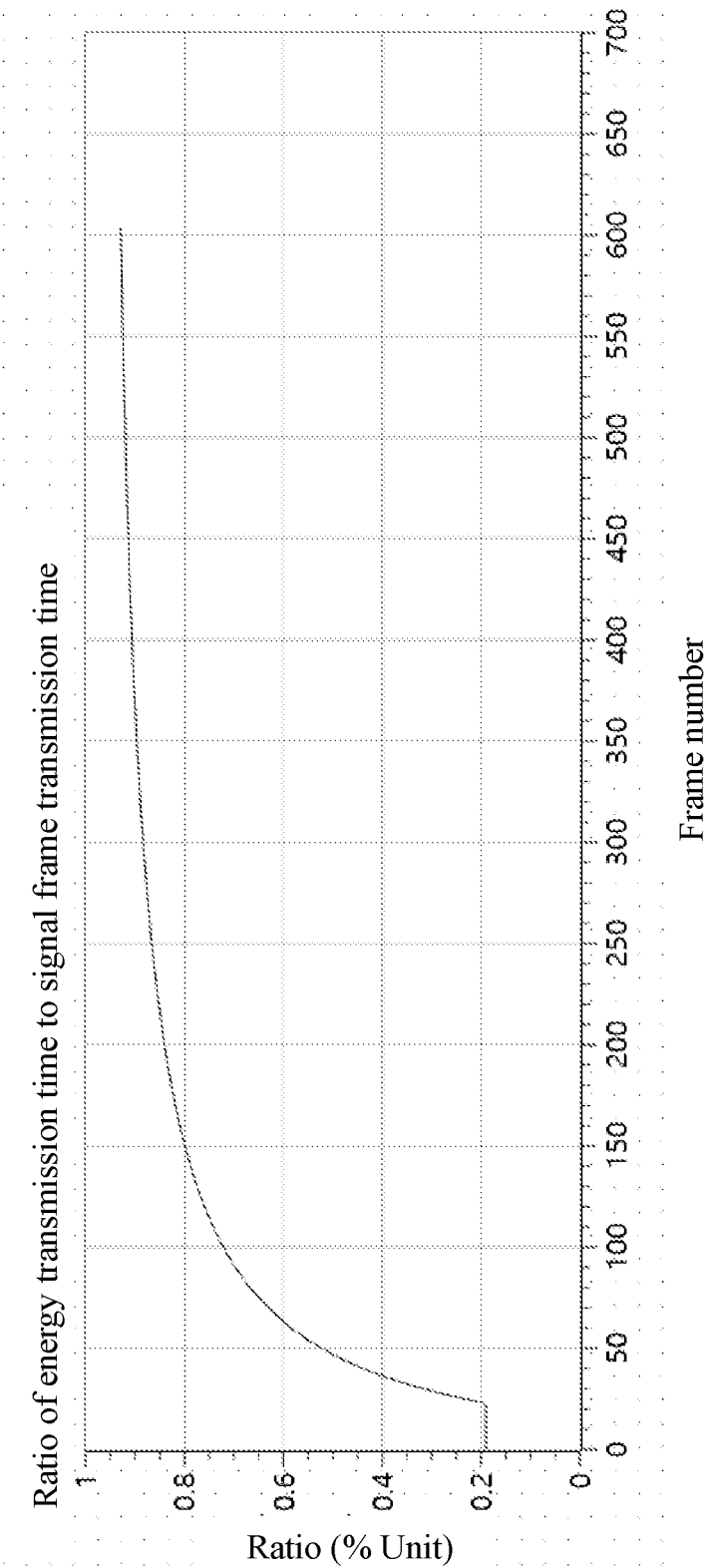
FIG. 23 is a diagram of ratios at the user end according to one embodiment of the present application.

FIG. 21, FIG. 22 and FIG. 23 are diagrams of three experimental results of transmitting 600 signal frames when no moving object exists in the test environment, wherein the initial 20 frames are the initialization period of the sliding window Q, and therefore the signal frames are time-sharing pilot frames, and after the initialization of 20 frames, since the change of the average energy $P_f$ does not exceed the floating threshold value σ, the base station considers that the downlink channel between the current base station and the user end is relatively stable, and then the time-sharing pilot frames are switches into energy transmission frames. In the following hundreds of frames, since no moving object exists in the environment and the environment state is relatively stable, the energy transmission frames are used in the following transmission process and are not switched into the time-sharing pilot frames. As can be seen from FIG. 21, after 20 frames, since the signal frames are switched from the time-sharing pilot frames into the energy transmission frames, it can be seen that the energy reception is improved by nearly 4 times. As can be seen from FIG. 22, in the test process, since the channel is in a slow fading state, the average energy $P_f$ keeps fluctuating, but the range is always controlled within the threshold value, so that the dynamic switching strategy of the trigger signal is not adopted in the second half. FIG. 23 shows the effect of the dynamic transmission strategy algorithm on the energy transmission efficiency of the signal frame, during the beginning of the initialization of the window, R=192%, this is because the ratio of the energy symbols in the time-sharing pilot frames is not high. However, after the initialization of the window is completed and the condition for switching the energy transmission frames is satisfied, the ratio R starts to increase and approaches 97.6%, this is because the ratio of the energy symbols in the signal frames increases after the switching of energy transmission frames.

In summary, aiming at the design and demonstration of a wireless energy transmission solution based on a massive MIMO system, the present application builds an experimental software platform, for example, implements the modulation and scrambling of signals by using LabVIEW language on a master computer, implements a channel estimation algorithm and a precoding algorithm, and creatively provides the redesign of synchronous frames and a maximum energy transmission strategy for adaptively adjusting the frame structure.

The present application may be a system, a method and/or a computer program product. The computer program product may include a computer-readable storage medium having computer-readable program instructions loaded thereon for causing a processor to implement various aspects of the present application.

The computer-readable storage medium may be a tangible device that holds and stores the instructions for use by an instruction execution device. The computer-readable storage medium may include, but is not limited to, for example, an electronic storage device, a magnetic storage device, an optical storage device, an electromagnetic storage device, a semiconductor storage device, or any suitable combination of the foregoing. More specific examples (non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device such as punch card or in-groove raised structure having instructions stored thereon, and any suitable combination of the foregoing. The computer-readable storage medium as used herein is not to be interpreted as a transitory signal per se, such as a radio wave or other freely propagating electromagnetic wave, an electromagnetic wave propagating through a waveguide or other transmission medium (e.g., optical pulses through a fiber optic cable), or an electrical signal transmitted through an electrical wire.

While various embodiments of the present application have been described above, the descriptions are exemplary, not exhaustive, and not limited to the disclosed embodiments. Many modifications and variations will be apparent to those of ordinary skill in the art without departing from the scope and spirit of the described embodiments. The terms used herein are chosen in order to best explain the principles of the embodiments, the practical application or technical improvements in the market, or to enable others of ordinary skill in the art to understand the embodiments disclosed herein. The scope of the present application is defined by the appended claims.

What is claimed is:

1. A massive MIMO wireless energy transmission method based on dynamic frame transmission, comprising the following steps:
    controlling, by a base station, each antenna to transmit a pilot signal to a user end in a time-sharing mode by using a set time-sharing pilot frame;
    acquiring, by the user end, downlink channel state information from the antennae of the base station to the user end and feeding the downlink channel state information back to the base station; and
    calculating, by the base station, a precoding matrix based on the downlink channel state information, mapping data from a user layer to an antenna port by using the newly calculated precoding matrix, and performing beam forming calculation with maximization of an energy signal of the user end as a goal.

2. The method according to claim 1, wherein the time-sharing pilot frame is configured to comprise N LTE radio subframes, and each radio subframe comprises 14 OFDM symbols, wherein the $0^{th}$ OFDM symbol is configured as a synchronous frame for a receiving end to detect a starting point of the time-sharing pilot frame; the $1^{st}$ OFDM symbol to the $N_{bs}$ OFDM symbol are used for time-sharing pilot transmission of $N_{bs}$ antennae; the $N_{bs}+1^{th}$ OFDM symbol is null for distinguishing a transmission pilot and a transmission energy; the remaining OFDM symbols are used for energy transmission, and an OFDM symbol content of the transmitted energy is generated using a PN pseudo-random sequence of random numbers.

3. The method according to claim 2, wherein the base station calculates the precoding matrix by using the following steps:
    acquiring a three-dimensional channel state matrix $N_{bs}*N_{ue}*N_{sub}$ fed back by the user end, wherein $N_{bs}$ represents the number of antennae of the base station, $N_{ue}$ represents the number of antennae of the user end, $N_{sub}$ represents the number of subcarriers of the OFDM symbols, and for each subcarrier j, $1 \leq j \leq N_{sub}$, a channel state $H_j$ is a matrix of $N_{bs}*N_{ue}$; and
    performing singular value decomposition on each channel state matrix $H_j$ to obtain a right singular matrix $V_j$, taking a first column of each $V_j$ to obtain a column vector $\vec{v}_j$ with a dimension of $N_{bs}$, combining the column vectors $\vec{v}_j$ corresponding to all subcarriers to obtain a precoding matrix W with a dimension of $N_{bs}*N_{sub}$, and then applying, by the base station, the precoding matrix W to a signal to be transmitted to implement a precoding process.

4. The method according to claim 2, wherein a synchronous symbol of the synchronous frame adopts a direct current square wave.

5. The method according to claim 4, wherein the receiving end detects the starting point of the time-sharing pilot frame using a sliding window method, comprises the following steps:
    at the receiving end, storing continuously-received signals in a buffer area, wherein the number of sampling points of the signals stored in the buffer area at most is marked as $N_t$;
    setting a size of a sampling point of a direct current synchronous signal as $N_s$ and a size of a sliding window as S for a section of signals a received in the buffer area, and reversely sliding the sliding window from a tail part to a head part of the buffer area, wherein the size of the sliding window meets a constraint condition of $0<S\leq N_s$;

while the sliding window slides reversely, calculating an average value $V_k$ of signal amplitude values within the window as follows:

$$V_k = \frac{\sum_{k=0}^{S}|a_k+i|}{S}$$

wherein $0\leq k\leq N_t-N_r-N_s$ and k is a starting position of the sliding window in the buffer area; and setting a floating threshold value ρ, and when a difference value between the sampling point within the window and the average amplitude value within the window does not exceed the floating threshold value ρ, confirming that a synchronous symbol is positioned and expressed as follows:

$$g_k = \begin{cases} 1, & \text{if } \max\{||a_{k+i}|-V_k|\} < \rho \\ 0, & \text{if } \max\{||a_{k+i}|-V_k|\} > \rho \end{cases}$$
$$\text{s.t. } i \in \{0, S-1\}$$

wherein $g_k$ represents whether a current window is a synchronous symbol or not, when $g_k=1$, it is considered that a position of the current sliding window is a position of a synchronous signal of a frame, when $g_k=0$, it is considered that the position of the window is not a synchronous signal, and then the sliding window keeps moving.

6. The method according to claim 5, wherein further setting a threshold value θ of a lowest average amplitude value for pruning when the sliding window is sliding comprises the following steps:

not performing a calculation of $g_k$ when the average value of the signal amplitude values within the window $V_k<\theta$; and considering that the position of the sliding window is a synchronous signal and performing the calculation of $g_k$ when the average value of the signal amplitude values within the window $V_k\geq\theta$.

7. The method according to claim 2, wherein the base station is further provided with an energy transmission frame consisting of only energy symbols.

8. The method according to claim 7, wherein dynamic switching is performed for signal frames of two types of the time-sharing pilot frame and the energy transmission frame by using the following steps:

setting $N_f$ to express the number of energy symbols in an $f^{th}$ (f>0) signal frame, wherein when the time-sharing pilot frame is transmitted, $N_f=N_{f1}$, and $N_{f1}$ is the number of energy transmission symbols of the time-sharing pilot frame, and when the energy transmission frame is transmitted, $N_f=N_{f2}$, and $N_{f2}$ is the number of energy transmission symbols of the energy transmission frame;

defining a size of a sliding frame window as Q, wherein the frame window is used for monitoring a change of an average energy of signal frame energy symbols within the window, and when f≥Q, the average energy $P_f$ of signal frame energy symbols within the window at the $f^{th}$ signal frame is expressed as follows:

$$P_f = \frac{1}{\sum_{f=Q+1}^{f}N_f}\sum_{f=Q+1}^{f}\Sigma_{i=1}^{N_f}p_{f,i}$$

wherein $P_{f,i}$ represents an energy of an $i^{th}$ OFDM energy symbol in the $f^{th}$ signal frame;

defining a change threshold value σ after the average energy $P_f$ of the sliding window at the $f^{th}$ signal frame is obtained, when an absolute value of a difference value between an energy of each energy symbol of the sliding window at the receiving end and $P_f$ is smaller than σ, considering that a current channel is in a slow fading state, and at the moment, switching the time-sharing pilot frame into the energy transmission frame by using a dynamic transmission strategy; and when the absolute value of the difference value between the energy of each energy symbol of the sliding window at the receiving end and $P_f$ is larger than σ, considering that the current channel state is unstable, and at the moment, switching the energy transmission frame into the time-sharing pilot frame; and when an energy value of a unit OFDM symbol is stable again, switching the time-sharing pilot frame into the energy transmission frame.

9. A non-transitory computer-readable storage medium having a computer program stored thereon, wherein the program, when executed by a processor, implements the steps of the method according to claim 1.

10. A computer device comprising a memory and a processor, wherein a computer program capable of operating on the processor is stored on the memory, and the processor, when executing the program, implements the steps of the method according to claim 1.

* * * * *